United States Patent
Ikeda

(10) Patent No.: US 9,979,876 B2
(45) Date of Patent: May 22, 2018

(54) IMAGING APPARATUS, IMAGING METHOD, AND STORAGE MEDIUM

(71) Applicant: Olympus Corporation, Hachioji-shi, Tokyo (JP)

(72) Inventor: Makoto Ikeda, Kunitachi (JP)

(73) Assignee: Olympus Corporation, Tokyo (JP)

( * ) Notice: Subject to any disclaimer, the term of this patent is extended or adjusted under 35 U.S.C. 154(b) by 35 days.

(21) Appl. No.: 15/170,543

(22) Filed: Jun. 1, 2016

(65) Prior Publication Data
US 2016/0360093 A1 Dec. 8, 2016

(30) Foreign Application Priority Data
Jun. 4, 2015 (JP) ................. 2015-113624

(51) Int. Cl.
*H04N 5/232* (2006.01)
*H04N 5/369* (2011.01)

(52) U.S. Cl.
CPC ....... *H04N 5/23212* (2013.01); *H04N 5/3696* (2013.01)

(58) Field of Classification Search
CPC ................................. H04N 5/23212
USPC ......................................... 348/350
See application file for complete search history.

(56) References Cited

U.S. PATENT DOCUMENTS

| | | | | |
|---|---|---|---|---|
| 2012/0033128 A1* | 2/2012 | Nagano | .................... | G02B 7/34 348/349 |
| 2015/0009383 A1* | 1/2015 | Fujii | .................... | H04N 5/347 348/302 |

FOREIGN PATENT DOCUMENTS

| | | |
|---|---|---|
| JP | 5319347 | 10/2013 |
| JP | 5565105 | 8/2014 |

\* cited by examiner

*Primary Examiner* — Joel Fosselman
(74) *Attorney, Agent, or Firm* — John C. Pokotylo; Pokotylo Patent Services

(57) ABSTRACT

A phase difference pixel extraction unit reads phase difference pixel data obtained by performing a storing operation in the same storing time for each of the phase difference pixels in each frame of an imaging operation of an image pickup device. A phase difference pixel calculation unit adds the read frame-by-frame phase difference pixel data of the same coordinates in a current frame and a past frame. A determination unit determines whether to perform a focus detection operation based on the added phase difference pixel data. A ranging calculation processing unit applies the added phase difference pixel data when it is determined, and otherwise applies the phase difference pixel data in the current frame.

20 Claims, 18 Drawing Sheets

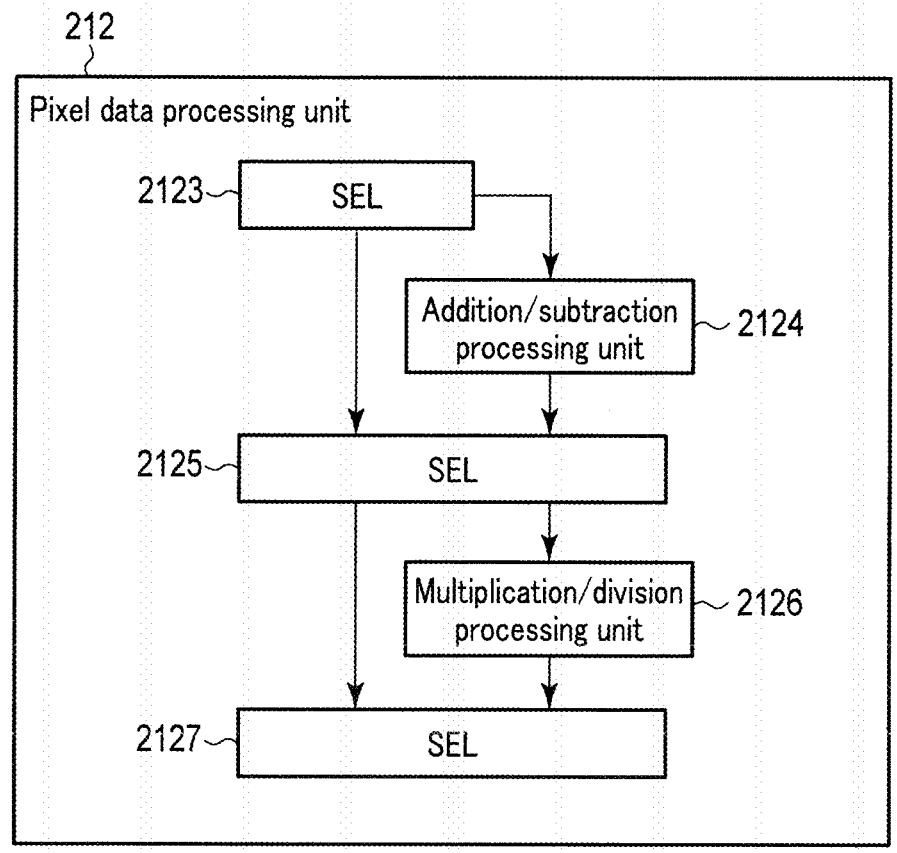
F I G. 5

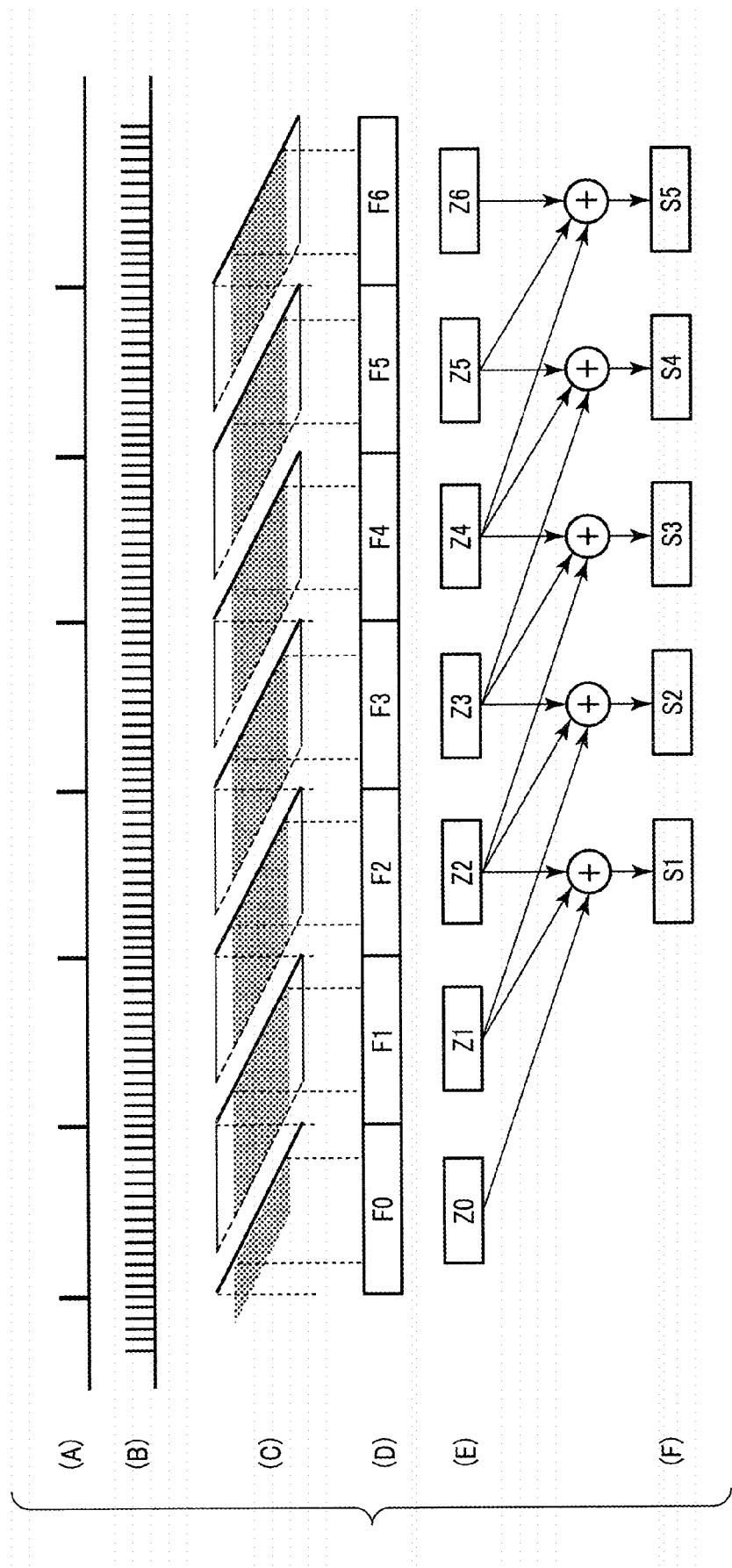
F I G. 12

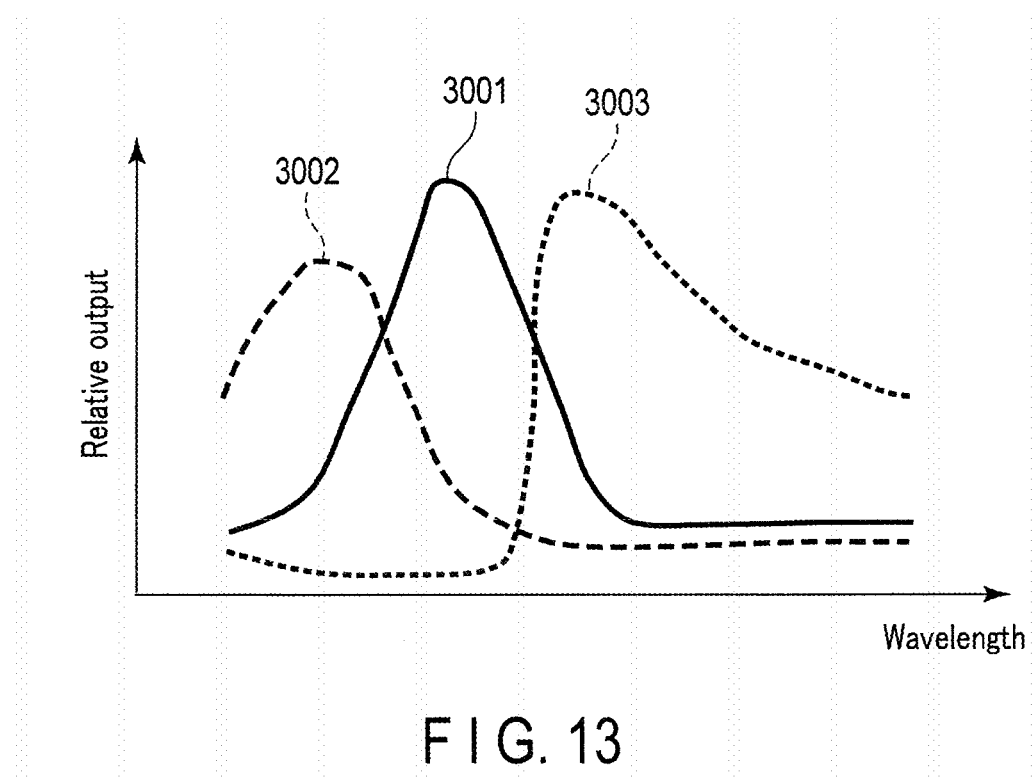
F I G. 13

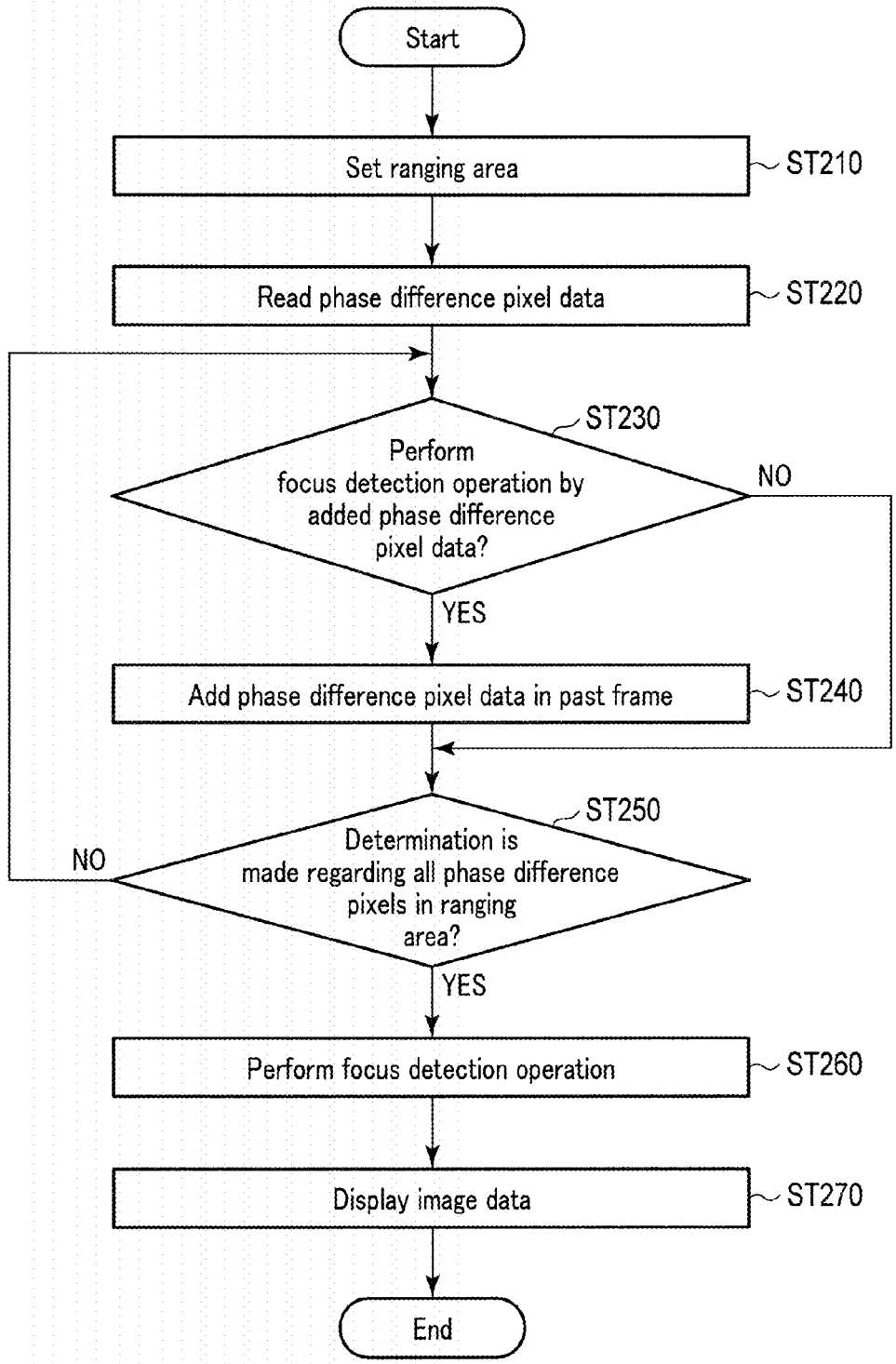
F I G. 14

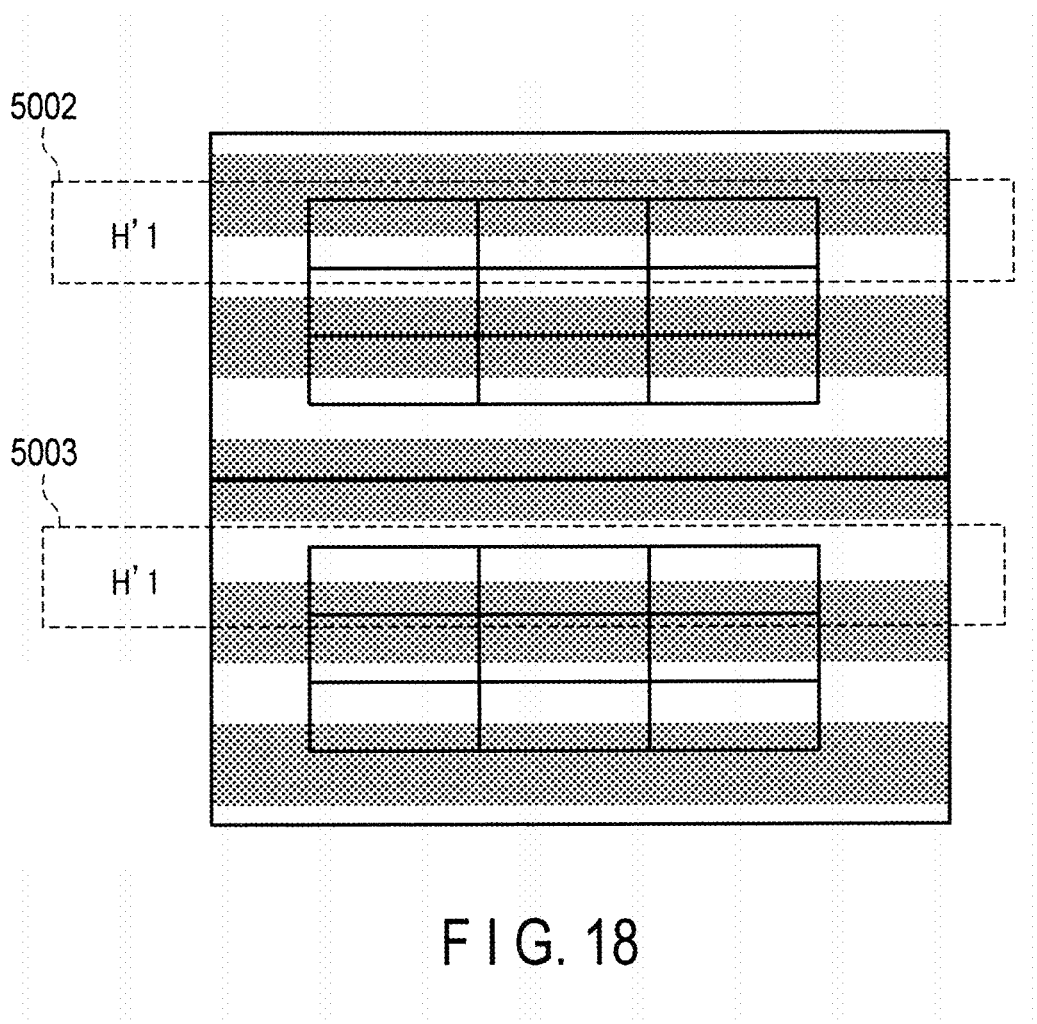
F I G. 18

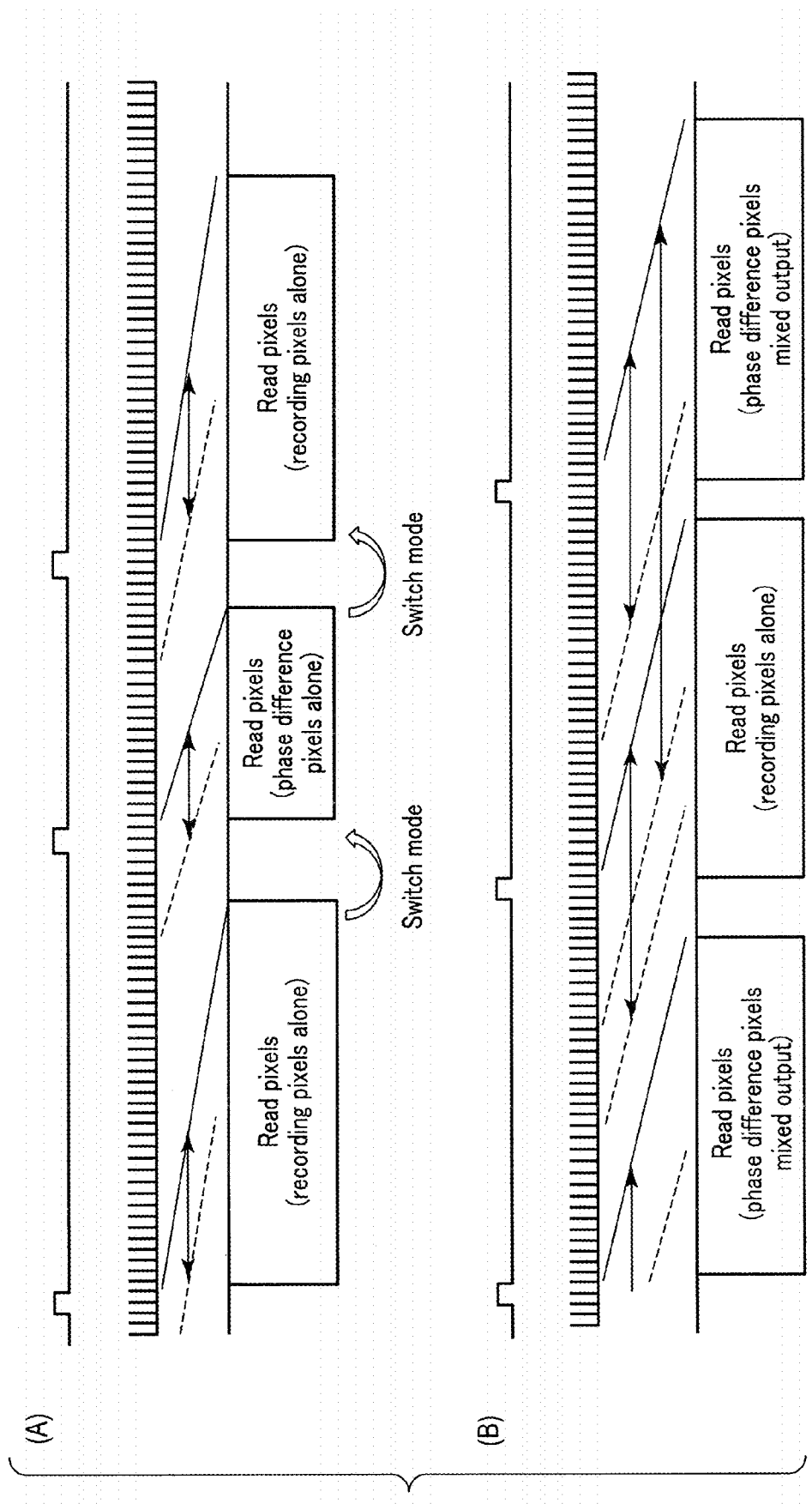

IMAGING APPARATUS, IMAGING METHOD, AND STORAGE MEDIUM

CROSS-REFERENCE TO RELATED APPLICATIONS

This application is based upon and claims the benefit of priority from Japanese Patent Application No. 2015-113624, filed Jun. 4, 2015, the entire contents of which are incorporated herein by reference.

BACKGROUND OF THE INVENTION

1. Field of the Invention

This invention relates to an imaging apparatus which performs a ranging calculation by use of a phase difference pixel output, an imaging method, and a storage medium.

2. Description of the Related Art

There has been known a technique to perform a ranging calculation by use of a phase difference pixel output of phase difference pixels arranged on an imaging surface, and detect a focus on the basis of the result of the ranging calculation. In the ranging calculation, ranging performance deteriorates due to the increase of a calculation error when the phase difference pixel output is smaller than a sensor output range. It is therefore necessary to ensure a predetermined phase difference pixel output.

However, in general, the phase difference pixel output is about half or less than a recording pixel output used for display or recording. Thus, various methods to ensure that the phase difference pixel output may be substantially equal to the recording pixel output have been suggested.

For example, according to Japanese Patent No. 5319347, storage control of a charge in an imaging row used for pixel generation and storage control of a charge in a focus detection row having phase difference pixels are independently performed in one frame.

According to Japanese Patent No. 5565105, additional focus detection data is calculated by performing addition processing to add at least one focus detection data to the latest focus detection data included in the latest pixel data among pixel data generated by an image pickup device.

BRIEF SUMMARY OF THE INVENTION

In general, according to an aspect of embodiments, an imaging apparatus includes an image pickup device, a phase difference pixel extraction unit, a phase difference pixel calculation unit, a determination unit, and a ranging calculation processing unit.

The image pickup device comprises recording pixels, and phase difference pixels in which part of an opening of a light receiving portion in each of the recording pixels is blocked.

The phase difference pixel extraction unit reads phase difference pixel data obtained by performing a storing operation in the same storing time for each of the phase difference pixels in each frame of an imaging operation of the image pickup device.

The phase difference pixel calculation unit adds the read frame-by-frame phase difference pixel data of the same coordinates in a current frame and a past frame.

The determination unit determines whether to perform a focus detection operation based on the added phase difference pixel data in accordance with the characteristics of each of the phase difference pixels and the phase difference pixel data corresponding to the phase difference pixels.

The ranging calculation processing unit applies the phase difference pixel data added by the phase difference pixel calculation unit when it is determined to perform the focus detection operation on the basis of the added phase difference pixel data, and otherwise applies the phase difference pixel data in the current frame to perform the focus detection operation.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 5 is a block diagram showing one example of a functional configuration of a pixel data processing unit according to the first embodiment;

FIG. 12 is a timing chart showing one example of the operation of the imaging apparatus according to the first embodiment;

FIG. 13 is a schematic diagram showing one example of spectral characteristics of an optical filter according to the first embodiment;

FIG. 14 is a flowchart showing one example of the operation according to a second embodiment of this invention;

FIG. 18 is a schematic diagram showing one example of the change of the output level of T/B pixels in the ranging area according to the second embodiment; and FIG. 19 is a schematic diagram showing one example of a reading method applicable to each of the embodiments of the present invention.

DETAILED DESCRIPTION OF THE INVENTION

Hereinafter, each embodiment according to the present invention will be described with reference to the drawings.

First Embodiment

Figure 1:
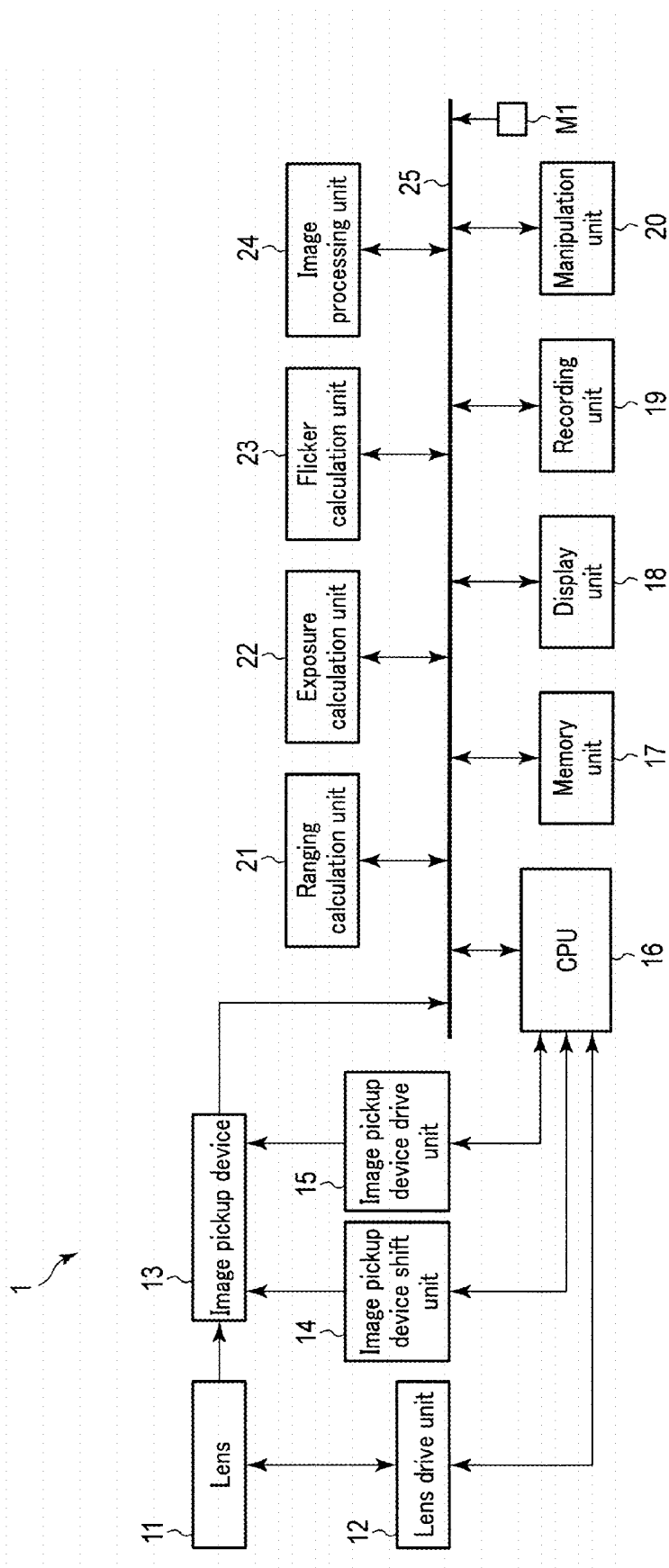
FIG. 1 is a block diagram showing one example of a functional configuration of an imaging apparatus according to a first embodiment of this invention.

FIG. 1 is a block diagram showing the configuration of a digital camera (hereinafter briefly referred to as a camera) as one example of an imaging apparatus according to each embodiment of the present invention. A camera 1 shown in FIG. 1 comprises a lens 11, a lens drive unit 12, an image pickup device 13, an image pickup device shift unit 14, an image pickup device drive unit 15, a central processing unit (CPU) 16, a memory unit 17, a display unit 18, a recording unit 19, a manipulation unit 20, a ranging calculation unit 21, an exposure calculation unit 22, a flicker calculation unit 23, an image processing unit 24, and a data/control bus 25. The imaging apparatus 1 used in the first embodiment can be obtained by either a hardware configuration or a combinational configuration of hardware resources and software. The software of the combinational configuration is previously installed into the imaging apparatus 1 from a network or a non-transitory computer-readable storage medium Ml, as shown in FIG. 1. For example, a program to enable the functions of the imaging apparatus 1 in the ranging calculation unit 21 is used as the software installed in this imaging apparatus 1.

The lens 11 is an optical system to form a figure from an unshown subject into an image on a light receiving surface of the image pickup device 13. This lens 11 has lenses such as a focus lens and a zoom lens, and a diaphragm.

The lens drive unit 12 performs, for example, the focus adjustment of the lens 11 and aperture diameter control of the diaphragm on the basis of a control signal from the CPU 16.

The image pickup device 13 comprises two-dimensionally arranged photodiodes (hereinafter referred to as light receiving portions) that constitute pixels. The light receiving portions that constitute the image pickup device 13 generate a charge corresponding to a receiving amount of light collected by a microlens. The charge generated in the light receiving portions is stored in a capacitor connected to each of the light receiving portions. The charge stored in this capacitor is output as a pixel signal by the image pickup device drive unit 15. The pixel signal is subjected to processing such as noise reduction processing and gain adjustment processing by an unshown imaging circuit, and then output as an image signal (hereinafter referred to as pixel data) in a digital format. Here, the image pickup device 13 preferably has an electronic shutter function. The electronic shutter function is a function to electronically control the exposure time of the image pickup device 13 on the basis of the calculation result in the exposure calculation unit 22. As the electronic shutter, various electronic shutters such as a rolling shutter and a global shutter are applicable depending on a drive method of the image pickup device 13 that will be described later.

Color filters of Bayer arrangement are disposed in front of the light receiving portions that constitute the pixels. The Bayer arrangement has lines in which R pixels and G (Gr) pixels are alternately disposed, and lines in which G (Gb) pixels and B pixels are alternately disposed in a horizontal direction. The arrangement of the color filters is not exclusively the Bayer arrangement, and a different arrangement of other optical filters such as complementary color filters (green: G, yellow: Y, Mg: magenta, and cyan: Cy) is also suitably applicable.

Figures 2, 3:
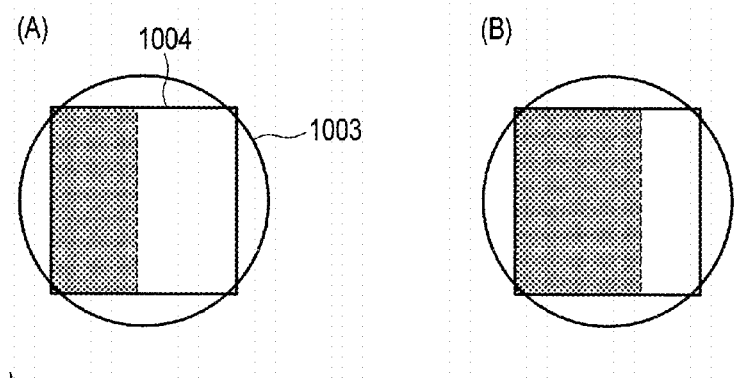
FIG. 2 is a schematic diagram showing one example of pixel arrangement in an image pickup device according to the first embodiment.
FIG. 3 is a schematic diagram showing a light receiving portion seen from the front according to the first embodiment.

Here, the image pickup device 13 in the present embodiment has, as components that enable phase difference autofocus, recording pixels (normal pixels or imaging pixels) to acquire imaging pictures for recording or display, and phase difference pixels (focus detection pixels) for focus detection. FIG. 2 is a diagram showing pixel arrangement in the image pickup device 13 in the present embodiment. As shown in FIG. 2, phase difference pixels 1002$r$, $l$, $t$, and $b$ are discretely disposed relative to recording pixels 1001. The phase difference pixels 1002$r$, $l$, $t$, and $b$ and the recording pixels 1001 are configured to have the same light collection efficiency of the microlens and the same distance from the microlens to the light receiving portions. The phase difference pixels 1002$r$, $l$, $t$, and $b$ are configured so that the positions of the openings of the light receiving portions are shifted as compared to those of the recording pixels 1001 or the center of the opening are shifted relative to the center of the optical axis to physically block part of the light receiving portions. The directions of light block regions of the phase difference pixels 1002$r$, $l$, $t$, and $b$ vary depending on whether the vertical lines or horizontal lines of the subject are detected. The phase difference pixels are respectively opened in a right/left (R/L) direction or a top/bottom (T/B) direction in accordance with the detection direction. In FIG. 2, the phase difference pixel 10021 opening in the left direction and the phase difference pixel 1002$r$ opening in the right direction are arranged along a vertical direction (three pixels apart from each other in FIG. 2) on the pixels of the same color (the Gr pixels in FIG. 2). The phase difference pixel 1002$t$ opening in the top direction and the phase difference pixel 1002$b$ opening in the bottom direction are arranged along a horizontal direction (three pixels apart from each other in FIG. 2) on the pixels of the same color (the B pixels in FIG. 2).

As shown in FIG. 3, the phase difference pixels are configured to be able to range regardless of whether a defocus amount is great or small. Specifically, the pixels having different opening ratios are arranged in the respective light blocking directions. FIG. 3 is a schematic diagram in which the light receiving portion is seen from the front, wherein a circular portion indicates a microlens 1003, and a square portion indicates a light receiving region 1004 of the light receiving portion. A hatched region of the light receiving region indicates that light is blocked. Here, FIG. 3(A) shows a right opening pixel for small defocus in which the light blocking rate is low, and FIG. 3(B) shows a right opening pixel for great defocus in which the light blocking rate is high. Thus, the phase difference pixels are limited in light entrance amount so that the output level of pixel data dampens. For example, if a light blocking area ratio is 50%, the output level of phase difference pixel data (focus detection pixel data) dampens to about ¹⁄₁₄ to ¹⁄₂₀ of the output level of recording pixel data (imaging pixel data) during saturation exposure.

Although a complementary metal oxide semiconductor (CMOS) method is applied as the drive method of the image pickup device drive unit 15 in the example described in the present embodiment, not only the CMOS method but also a charge coupled device (CCD) method is suitably applicable.

The image pickup device shift unit 14 physically moves the image pickup device 13 in a plane parallel to the light receiving surface thereof and corrects, for example, a hand movement on the basis of a control signal from the CPU 16.

The image pickup device drive unit 15 is driven on the basis of a control signal from the CPU 16, and reads, as a pixel signal, the charge stored in the image pickup device 13. The read pixel signal is converted into pixel data in a digital format, and sent to and stored in the memory unit 17 via the data/control bus 25.

According to a method of reading the charge by the image pickup device drive unit 15 in the present embodiment, a storing operation is performed in the same storing time for each phase difference pixel in each frame of an imaging operation of the image pickup device 13, and pixel data is thereby obtained.

The CPU 16 takes overall control of various sequences of the camera 1 such as driving control of the lens 11 by the lens drive unit 12 and driving control of the image pickup device 13 by the image pickup device shift unit 14 and the image pickup device drive unit 15. The CPU 16 is interconnected with the memory unit 17, the display unit 18, the recording unit 19, the manipulation unit 20, the ranging calculation unit 21, the exposure calculation unit 22, the flicker calculation unit 23, and the image processing unit 24 via the data/control bus 25, and can send control instructions and exchange data.

The memory unit 17 is a storage medium that permits reading/writing from each unit, and acts as a working memory to transitorily store various data generated inside the camera 1. The memory unit 17 stores, for example, pixel data read from the image pickup device 13 by the image pickup device drive unit 15.

The display unit 18 is, for example, a liquid crystal display, and displays various images such as a still image, a moving image, and a display image based on the image data processed by the image processing unit 24.

The recording unit 19 is, for example, a memory card which is attachable to and detachable from the camera 1. For example, an image file including image data compressed by the image processing unit 24 is recorded in the recording unit 19.

The manipulation unit 20 is a manipulation component such as an electric power button, a shutter button, a reproduction button, and various input keys. The manipulation unit 20 may also include a manipulation component to set a focus detection area in which a focus detection operation by the ranging calculation unit 21 is performed. If the manipulation unit 20 is manipulated by a photographer, the CPU 16 executes a sequence corresponding to this manipulation.

Figure 4:
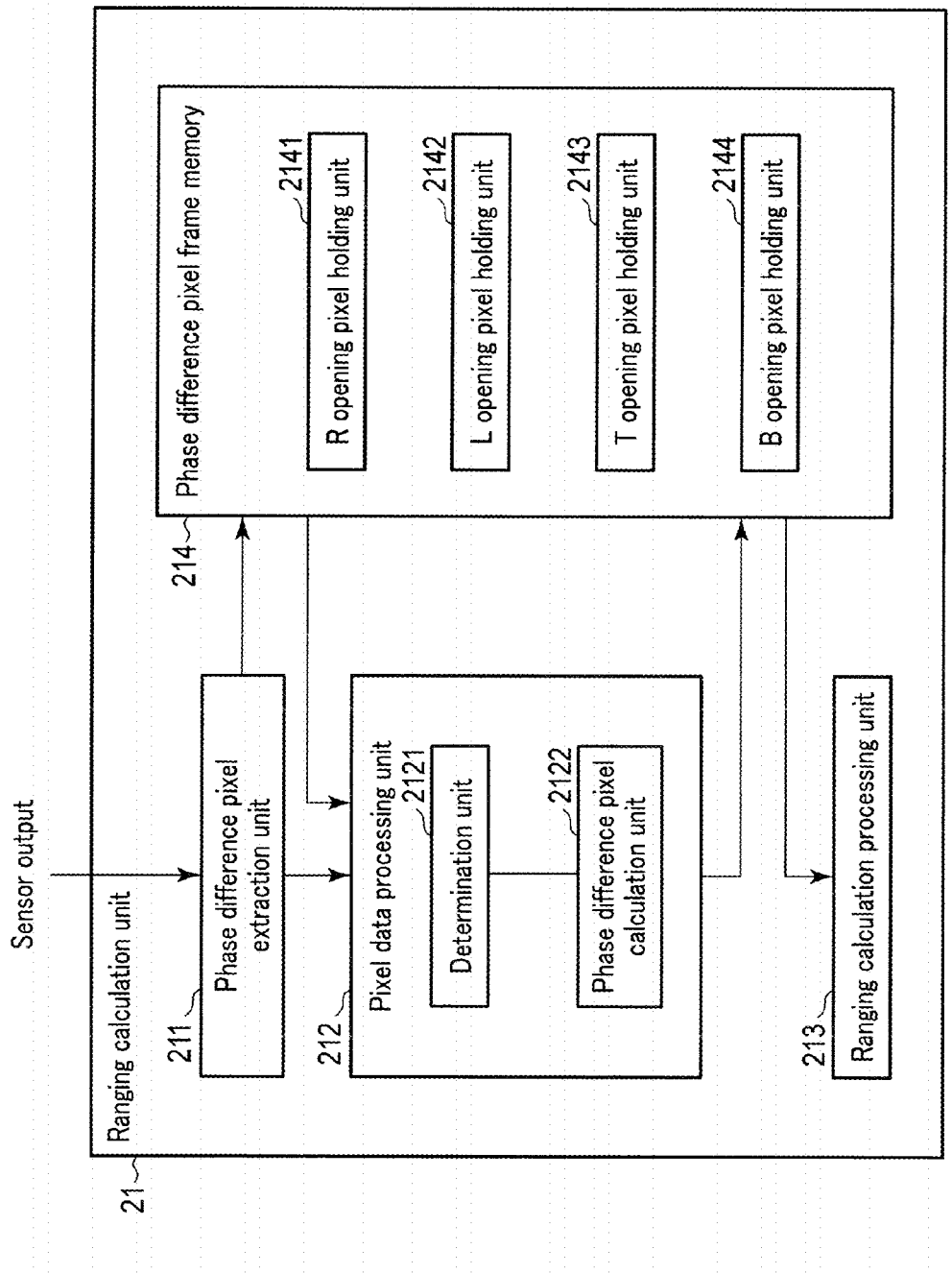
FIG. 4 is a block diagram showing one example of a functional configuration of a ranging calculation unit according to the first embodiment.

As shown in FIG. 4, the ranging calculation unit 21 comprises a phase difference pixel extraction unit 211, a pixel data processing unit 212, a ranging calculation processing unit 213, and a phase difference pixel frame memory 214. The ranging calculation unit 21 has a function to read the phase difference pixel data for each frame on the basis of a control signal from the CPU 16, and perform the focus detection operation on the basis of the phase difference pixel data for each frame. A functional configuration of the ranging calculation unit 21 will be described later.

The exposure calculation unit 22 calculates an exposure amount of the image pickup device 13 on the basis of, for example, an input from the manipulation unit 20. The exposure calculation unit 22 sends the calculation result to the image pickup device drive unit 15 via the CPU 16.

The flicker calculation unit 23 reads the recording pixel data stored in the memory unit 17, and detects a flicker on the basis of this recording pixel data. If a flicker is detected, the flicker calculation unit 23 calculates control information to eliminate this flicker, and sends the calculation result to the image pickup device drive unit 15 via the CPU 16.

The image processing unit 24 reads the recording pixel data stored in the memory unit 17, and performs various image processing on the basis of this recording pixel data to generate image data. For example, in the case of the recording of a still image, the image processing unit 24 performs image processing for still image recording to generate still image data. Similarly, in the case of the recording of a moving image, the image processing unit 24 performs image processing for moving image recording to generate moving image data. Moreover, in the case of live-view display, the image processing unit 24 performs image processing for display to generate image data for display.

Next, the functional configuration of the ranging calculation unit 21 is described with reference to FIG. 4. The phase difference pixel extraction unit 211 reads the phase difference pixel data which has been obtained by performing the storing operation in the same storing time for each phase difference pixel in each frame of an imaging operation. The phase difference pixel extraction unit 211 reads the phase difference pixel data in a raster order, for example, in each condition of an opening direction, thereby reading in the minimum memory size while maintaining the correspondence of coordinates between frames. Therefore, the phase difference pixel extraction unit 211 can also associate and read the phase difference pixel characteristics of the read phase difference pixel data in each frame. The phase difference pixel extraction unit 211 sends the read frame-by-frame phase difference pixel data to the pixel data processing unit 212, and writes the data into the phase difference pixel frame memory 214. The phase difference pixel extraction unit 211 may directly receive the pixel data read by the image pickup device drive unit 15, and read the phase difference pixel data from the received pixel data.

The pixel data processing unit 212 comprises a determination unit 2121 and a phase difference pixel calculation unit 2122. The pixel data processing unit 212 receives the phase difference pixel data in the current frame from the phase difference pixel extraction unit 211 in the raster order, and receives the phase difference pixel data in the corresponding past frame from the phase difference pixel frame memory 214. The pixel data processing unit 212 processes the phase difference pixel data in the current frame and the past frame to generate phase difference pixel data to be applied to the focus detection operation, and sends the data to the ranging calculation processing unit 213.

Having received the phase difference pixel data in the current frame in the raster order, the determination unit 2121 determines whether to perform the focus detection operation on the basis of the calculation result by the phase difference pixel calculation unit 2122 in accordance with the characteristics of each of the phase difference pixels and the phase difference pixel data corresponding to each of the phase difference pixels. The calculation here is the addition of the phase difference pixel data in the current frame and the past frame. When determining to perform the focus detection operation on the basis of the calculation result, the determination unit 2121 decides, for example, calculation information including the number of the past frames added by the phase difference pixel calculation unit 2122. The determination unit 2121 sends the calculation information and the phase difference pixel data in the current frame to the phase difference pixel calculation unit 2122. When determining not to perform the focus detection operation on the basis of the calculation result, the determination unit 2121 sends the phase difference pixel data in the current frame to the phase difference pixel frame memory 214.

Having received the calculation information and the phase difference pixel data in the current frame in the raster order, the phase difference pixel calculation unit 2122 receives the corresponding phase difference pixel data in the number of the past frames for use in calculation from the phase difference pixel frame memory 214 on the basis of the number of frames in the calculation information. The phase difference pixel calculation unit 2122 adds phase difference pixel data of the same coordinates in the current frame and the past frame to the frame-by-frame phase difference pixel data read by the phase difference pixel extraction unit 211. The phase difference pixel calculation unit 2122 sends the added phase difference pixel data to the phase difference pixel frame memory 214.

The phase difference pixel calculation unit 2122 may have functions of subtraction, multiplication, and division, and may perform multiple kinds of calculations in accordance with the determination result by the determination unit 2121. In this case, the calculation information generated by the determination unit 2121 further includes, for example, the presence of calculations other than the addition calculation, and an operational expression indicating the order of the execution of the calculations. For example, the calculation information in which the number of past frames is "1" and in which the operational expression is "(current frame+past frames)/2" indicates the additional average of the current frame and one past frame. The function of multiplication is used, for example, for a gain increase in the phase difference pixel data. The function of subtraction is used, for example, to estimate the degree of movement of the subject between frames by evaluating an output difference between the frames.

A specific configuration in the pixel data processing unit 212 may comprise selectors (SEL) 2123, 2125, and 2127, an addition/subtraction processing unit 2124, and a multiplication/division processing unit 2126, as shown in FIG. 5. Here, each of the SEL 2123, 2125, and 2127 may comprise a function equivalent to that of the determination unit 2121 described above, and the addition/subtraction processing unit 2124 and the multiplication/division processing unit 2126 may comprise a function equivalent to that of the phase difference pixel calculation unit 2122 described above. For example, when receiving each phase difference pixel data from the phase difference pixel extraction unit 211, the SEL 2123 determines whether to perform the addition calculation and/or the subtraction calculation. When determining to perform the addition calculation and/or the subtraction calculation, the SEL 2123 sends the phase difference pixel data to the addition/subtraction processing unit 2124. Otherwise, the SEL 2123 sends the phase difference pixel data to the SEL 2125. When receiving the phase difference pixel data from the SEL 2123, the addition/subtraction processing unit 2124 reads the phase difference pixel data of the same coordinates in the past frame, and performs the addition calculation and/or the subtraction calculation. The addition/subtraction processing unit 2124 sends the calculated phase difference pixel data to the SEL 2125. When receiving the phase difference pixel data, the SEL 2125 determines whether to perform the multiplication calculation and/or the division calculation. The SEL 2125 sends, to the multiplication/division processing unit 2126, the phase difference pixel data for which it has been determined to perform the multiplication calculation and/or the division calculation. Otherwise, the SEL 2125 sends the phase difference pixel data to the SEL 2127. When receiving the phase difference pixel data from the SEL 2125, the multiplication/division processing unit 2126 reads the phase difference pixel data of the same coordinates in the past frame, and performs the multiplication calculation and/or the division calculation. The multiplication/division processing unit 2126 sends the calculated phase difference pixel data to the SEL 2127. Having received the phase difference pixel data, the SEL 2127 determines whether to perform the focus detection operation on the basis of the phase difference pixel data. When determining to perform the focus detection operation, the SEL 2127 sends the phase difference pixel data to the phase difference pixel frame memory 214.

Here, the explanation returns to FIG. 4. When the determination and calculation by the pixel data processing unit 212 are finished, the ranging calculation processing unit 213 reads the processed phase difference pixel data written in the phase difference pixel frame memory 214 from the pixel data processing unit 212. When the determination unit 2121 determines to perform the focus detection operation on the basis of the added phase difference pixel data, the ranging calculation processing unit 213 applies the phase difference pixel data added by the phase difference pixel calculation unit 2122, and performs the focus detection operation. When the determination unit 2121 determines not to perform the focus detection operation on the basis of the added phase difference pixel data, the ranging calculation processing unit 213 applies the phase difference pixel data in the current frame, and then performs the focus detection operation. The ranging calculation processing unit 213 sends the execution result of the focus detection operation to the CPU 16.

Here, the ranging calculation processing in the present embodiment is performed by detecting a phase difference made between a pair of pixel data by the R/L opening pixels and the T/B opening pixels. However, as the detected phase difference, not only the phase difference between a pair of pixels but also the average value of the phase differences between pairs of pixels in a predetermined range in a ranging area is used in the case of both R/L and T/B.

The phase difference pixel frame memory 214 is a memory that permits reading/writing from each of the units 211, 212, and 213, and comprises an R opening pixel holding unit 2141, an L opening pixel holding unit 2142, a T opening pixel holding unit 2143, and a B opening pixel holding unit 2144. Each of the opening pixel holding units 2141 to 2144 stores the phase difference pixel data classified and read by the phase difference pixel extraction unit 211 in the raster order for each condition such as an opening direction so that the phase difference pixel data are associated by coordinate information and a frame unit. That is, the R opening pixel holding unit 2141 stores the phase difference pixel data for right opening pixels, the L opening pixel holding unit 2142 stores the phase difference pixel data for left opening pixels, the T opening pixel holding unit 2143 stores the phase difference pixel data for top opening pixels, and the B opening pixel holding unit 2144 stores the phase difference pixel data for bottom opening pixels. Each of the opening pixel holding units 2141 to 2144 may store the phase difference pixel data further classified by the phase difference pixel extraction unit 211 in accordance with other phase difference pixel characteristics such as the difference of the light blocking rates. The phase difference pixel frame memory 214 reads the phase difference pixel data in the past frame at the request of the phase difference pixel calculation unit 2122, and sends the phase difference pixel data to the phase difference pixel calculation unit 2122. The phase difference pixel frame memory 214 stores the processed phase difference pixel data sent from the pixel data processing unit 212, and sends the phase difference pixel data to the ranging calculation processing unit 213 at the request of the ranging calculation processing unit 213. The phase difference pixel frame memory 214 is not exclusively provided in the ranging calculation unit 21, and may be additionally provided in the memory unit 17.

Figure 6:
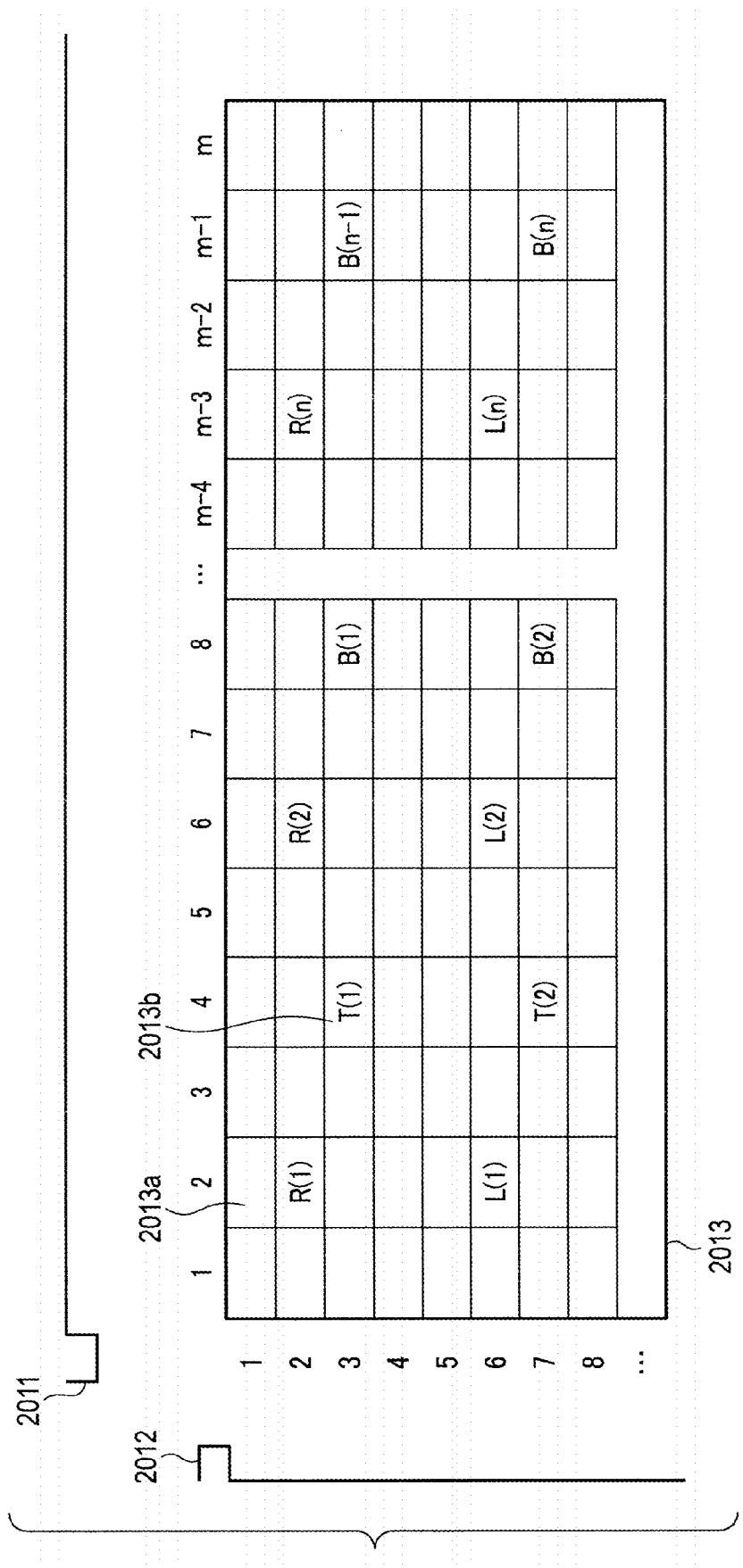
FIG. 6 is a schematic diagram illustrating one example of storage areas to store pixel data according to the first embodiment.
Figure 7:
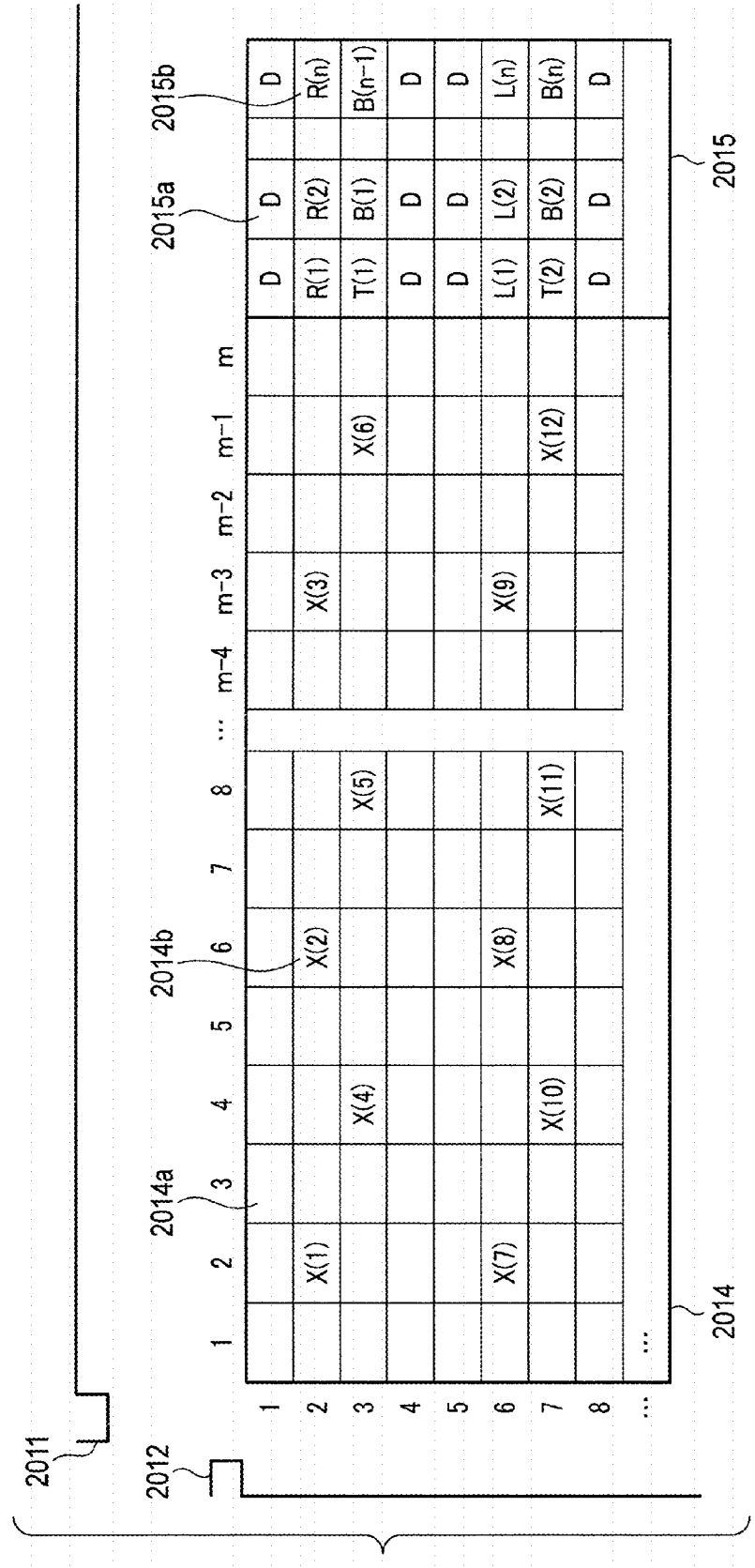
FIG. 7 is a schematic diagram illustrating one example of storage areas to store pixel data according to the first embodiment.

Here, an example of storage areas in a memory to store the read pixel data in the present embodiment is shown in FIG. 6 and FIG. 7. In the example of FIG. 6, triggered by a horizontal synchronization signal 2011, pixel data in a certain frame are read from the image pickup device 13 row by row and sequentially written into the storage area in order from pixel data in the pixel located in the first row regardless of the recording pixels and the phase difference pixels. Triggered by a vertical synchronization signal 2012, pixel data in the next frame are read from the image pickup device 13 row by row and written into the storage area in order from the first row again. In FIG. 6, a storage area 2013 indicates an area to which coordinates corresponding to the rows and columns of the pixel arrangement are allocated. Here, numbers indicated on the left end and upper end of the storage area 2013 correspond to row numbers and column numbers of the pixel arrangement, respectively. Blank storage areas 2013a in the storage area 2013 indicate storage areas for the recording pixel data. Storage areas 2013b with characters such as L, R, T, and B indicate storage areas for the phase difference pixel data that are open in the left, right, top, and bottom directions, respectively. In the storage area 2013, storage of the pixel data in one frame is triggered by the vertical synchronization signal 2012, and row-by-row storage of the pixel data is triggered by the horizontal synchronization signal 2011. The phase difference pixel data may be further associated with phase difference pixel characteristics such as the left, right, top, and bottom (L, R, T, and B) directions in which the respective phase difference pixels are blocked from light, the light blocking rates, and the kinds of optical filters, and stored in the storage areas 2013b accordingly.

In the example shown in FIG. 7, the recording pixel data and the phase difference pixel data are separately stored in storage areas 2014 and 2015. In the example of FIG. 7, pixel data in a certain frame are read from pixel data in the recording pixels alone in the first half of a horizontal period, and sequentially written into the storage areas. Moreover, in the example of FIG. 7, pixel data in a certain frame are read from pixel data in the phase difference pixels alone in the second half of the horizontal period, and sequentially written into the storage areas. In FIG. 7, storage areas 2014a indicate areas to store the recording pixel data as in FIG. 6. In contrast, storage areas 2014b do not indicate areas to store the phase difference pixel data but indicate areas to store, as the recording pixel data, a value X(n) interpolated by the recording pixel data for the surrounding adjacent pixels of the same color. The phase difference pixel data are transitorily held, for example, in a line memory provided in the image pickup device 13 in the first half of the horizontal period. The phase difference pixel data held in the line memory are read after the recording pixel data in the same row are stored in the storage area 2014, and the phase difference pixel data held are stored in storage areas 2015b. Dummy data D are stored in storage areas 2015a other than the areas to store the phase difference pixel data. In any case, the pixel data read in the present embodiment are stored in association with the coordinates of the pixel arrangement. The coordinates of the pixel arrangement are also associated with phase difference pixel characteristics such as light blocking directions of the phase difference pixel data, the light blocking rates, and the kinds of optical filters, and stored accordingly.

Figure 8:
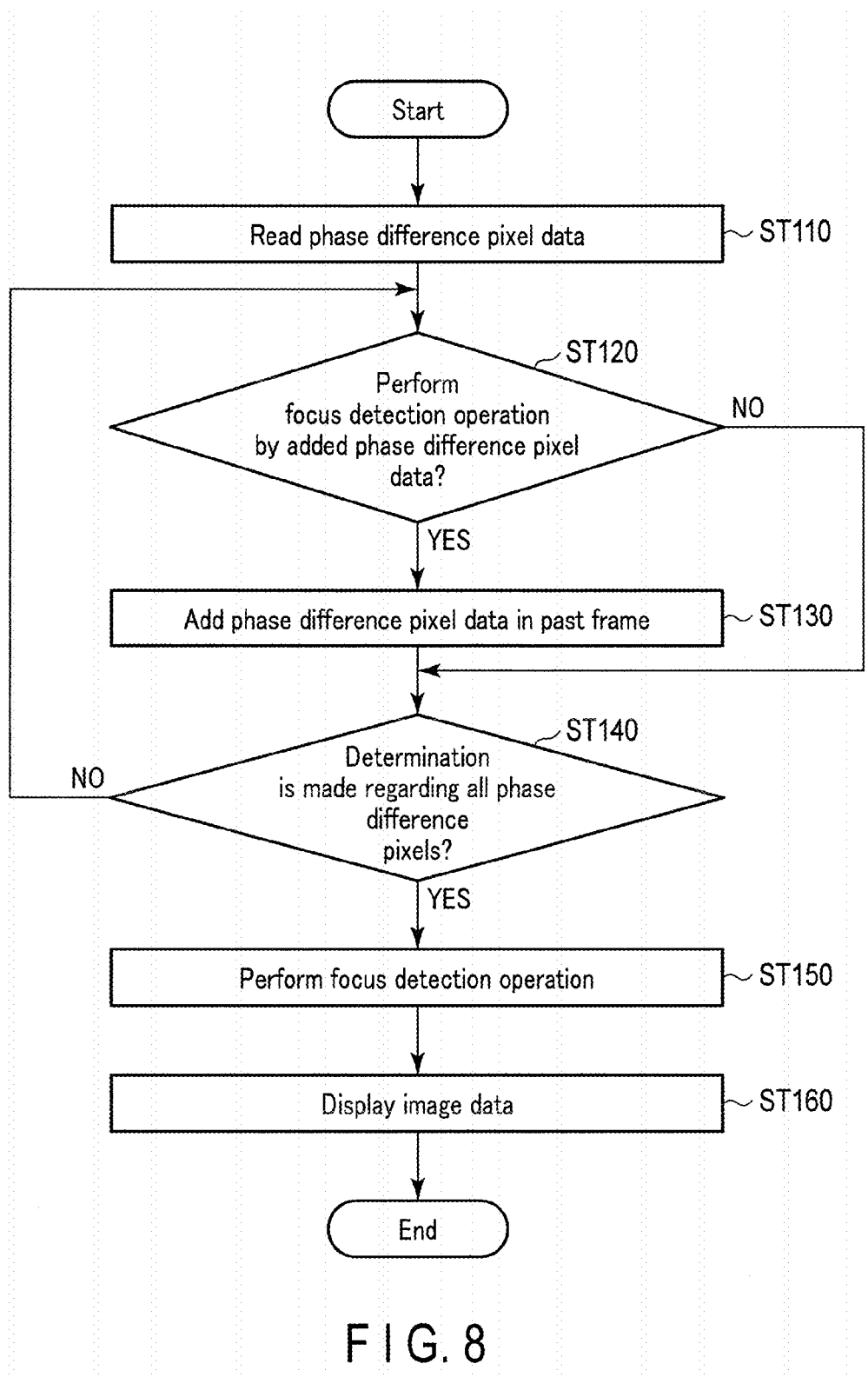
FIG. 8 is a flowchart showing one example of the operation of the imaging apparatus according to the first embodiment.

Next, a specific operation of the above imaging apparatus according to the present embodiment is described. FIG. 8 is a flowchart showing the processes of the focus detection operation by the imaging apparatus. Each of the processes in FIG. 8 is mainly performed by the ranging calculation unit 21 and the image processing unit 24. FIG. 8 is started, for example, when the shutter button of the manipulation unit 20 is half-pressed in a still image photography mode, but may be started at the time of moving image photography or at the time of live-view. In accordance with each of the processes in FIG. 8, the camera 1 acts along a timing chart shown in FIG. 9 by way of example. That is, in the following explanation, the camera 1 drives the image pickup device drive unit 15 in accordance with the CMOS sensor method, and reads pixel data from a charge stored in the image pickup device 13 by rolling reading.

First of all, the CPU 16 sends a vertical synchronization signal shown in FIG. 9(A) and a horizontal synchronization signal shown in FIG. 9(B) to the image pickup device drive unit 15.

Figure 9:
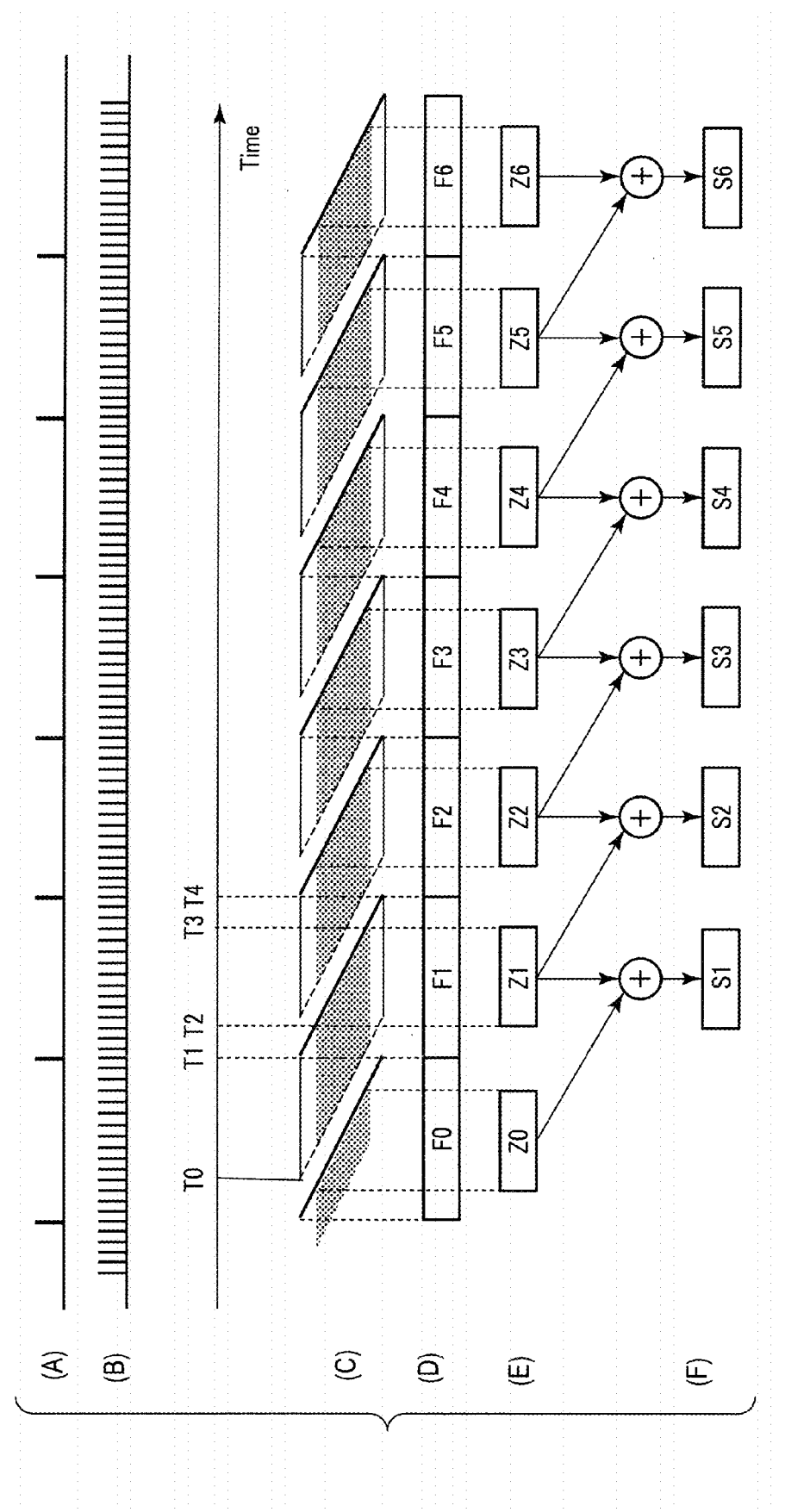
FIG. 9 is a timing chart showing one example of the operation of the imaging apparatus according to the first embodiment.

The image pickup device drive unit 15 then stores a charge in the image pickup device 13, and performs an output scan of the pixel data, as shown in FIG. 9(C). Specifically, the image pickup device drive unit 15 controls the electronic shutter from a time T0. Under this control, the light receiving portions of the image pickup device 13 are exposed for a given time row by row at staggered times in order from the top pixels to bottom pixels arranged on the image pickup device 13. The image pickup device drive unit 15 starts the output of the pixel data at a time T1 after the end of exposure. Here, in FIG. 9, the phase difference pixels are arranged in ranges other than the upper and lower ends of the light receiving surfaces among the ranges in which the recording pixels are arranged. Therefore, recording pixel data F1 is output in a period from the time T1 to a time T4 as shown in FIG. 9(D), and phase difference pixel data Z1 is output in a period from a time T2 to a time T3 as shown in FIG. 9(E). The camera 1 repeats a series of such operations from the time T0 to the time T4 frame by frame, and sequentially outputs recording pixel data Fn and phase difference pixel data Zn in a frame number n.

The phase difference pixel extraction unit 211 reads the phase difference pixel data which has been obtained by performing the storing operation in the same storing time for each phase difference pixel in each frame of the imaging operation of the image pickup device 13 (ST110). In FIG. 9, the phase difference pixel extraction unit 211 reads the phase difference pixel data Z1 output in the frame number "1", stores the phase difference pixel data Z1 in the phase difference pixel frame memory 214, and sends the phase difference pixel data Z1 to the pixel data processing unit 212. In this instance, at least phase difference pixel data Z0 in the frame number "0" is stored in the phase difference pixel frame memory 214 as pixel data in the past frame.

Depending on the characteristics of each phase difference pixel and the phase difference pixel data corresponding to each phase difference pixel, the determination unit 2121 determines whether to perform the focus detection operation on the basis of the added phase difference pixel data (ST120).

Specifically, when determining to perform the focus detection operation on the basis of the added phase difference pixel data (ST120; yes), the determination unit 2121 sends the phase difference pixel data Z1 in the current frame to the phase difference pixel calculation unit 2122. The phase difference pixel calculation unit 2122 receives the phase difference pixel data in the past frame from the phase difference pixel frame memory 214, and adds the phase difference pixel data of the same coordinates between the respective frames (ST130). The phase difference pixel calculation unit 2122 sends the added phase difference pixel data to the phase difference pixel frame memory 214. In contrast, when determining not to perform the focus detection operation on the basis of the added phase difference pixel data (ST120; no), the determination unit 2121 sends the phase difference pixel data in the current frame to the phase difference pixel frame memory 214. The pixel data processing unit 212 repeats steps ST120 to ST130 until steps ST120 to ST130 are performed for all the phase difference pixels (ST140).

The example of FIG. 9 assumes that the determination unit 2121 determines that all the phase difference pixel data are added. Therefore, the phase difference pixel calculation unit 2122 adds the phase difference pixel data Z1 to the phase difference pixel data Z0 in the previous frame to generate phase difference pixel data S1 as shown in FIG. 9(F).

Figure 10:
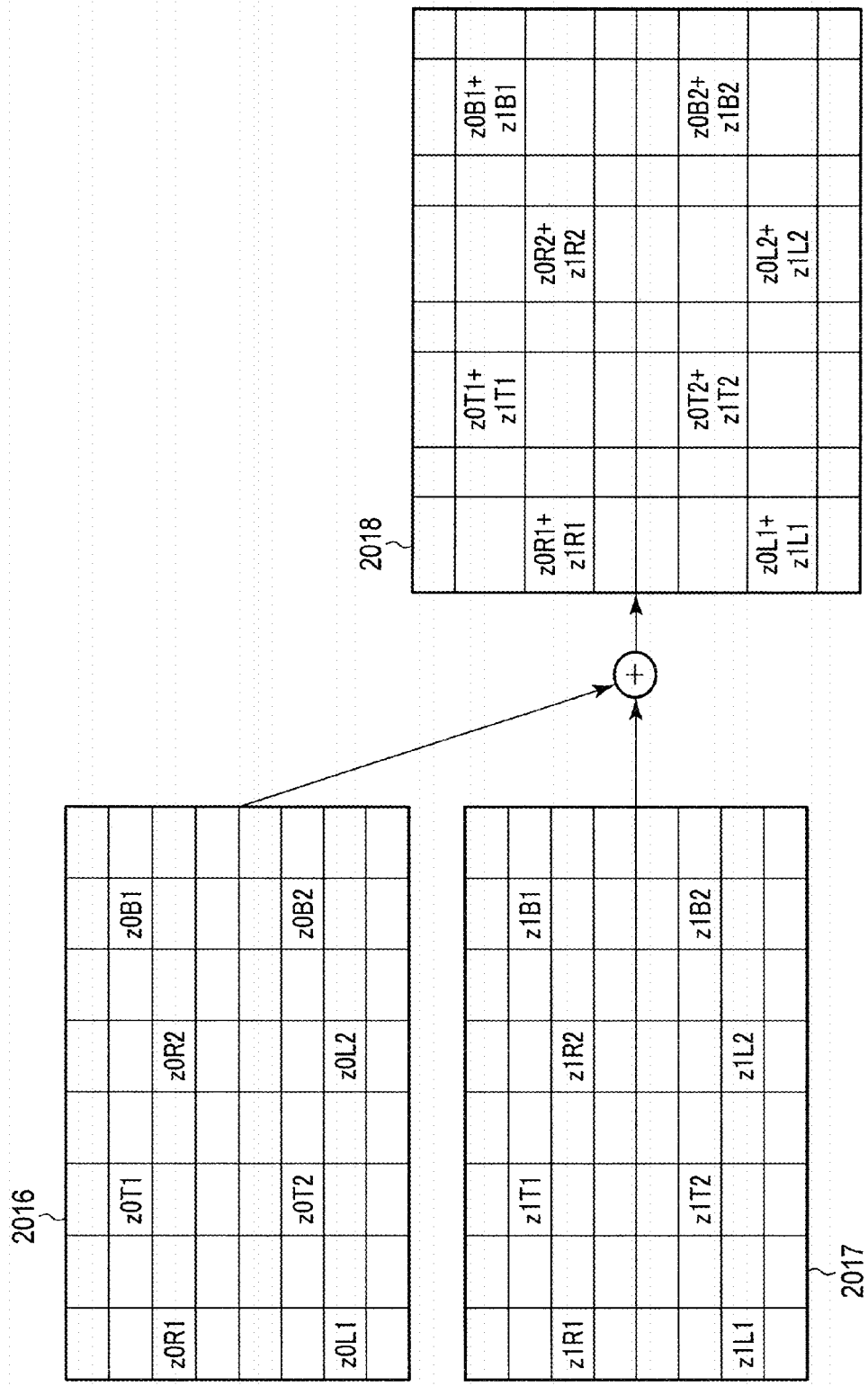
FIG. 10 is a schematic diagram showing one example of addition calculations according to the first embodiment.
Figure 11:
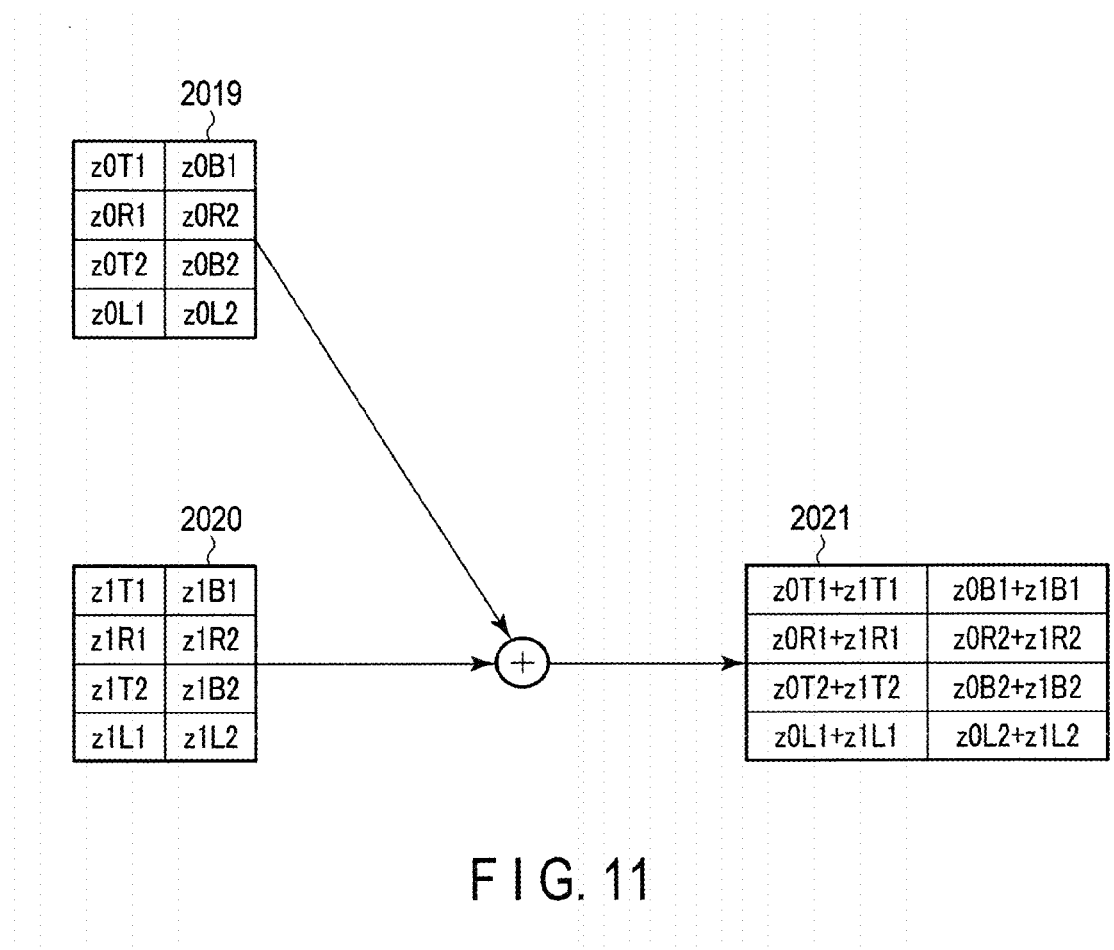
FIG. 11 is a schematic diagram showing one example of addition calculations according to the first embodiment.

Here, in the example of the addition calculation shown in FIG. 9, the addition calculation is performed regarding the pixel data for the phase difference pixels located at the same coordinates as shown in FIG. 10, in the case of the pixel arrangement in the image pickup device 13. Here, numerical values of the phase difference pixel data in each of pixel arrangements 2016 to 2018 indicate values of the frame number "0", the frame number "1", and the addition of the frame number "0" and the frame number "1", respectively. Blank areas on each of the pixel arrangements 2016 to 2018 indicate recording pixels, and areas with numerical values indicate the phase difference pixels from which the phase difference pixel data of these numerical values are output. At the time of the actual addition calculation, the phase difference pixel extraction unit 211 reads the phase difference pixel data alone from the storage areas in the raster order or in the order in which the phase difference pixel data are rearranged in a predetermined order such as an opening direction order, as shown in FIG. 11. Here, numerical values in each of pixel arrangements 2019 to 2021 indicate values of the frame number "0", the frame number "1", and the addition of the frame number "0" and the frame number "1", respectively. The read phase difference pixel data are also associated with phase difference pixel characteristics such as light blocking directions, the light blocking rates, and the kinds of optical filters as necessary. Therefore, the phase difference pixel calculation unit 2122 can perform a calculation between frames in the minimum memory area while maintaining the association with phase difference pixel characteristics such as predetermined coordinate arrangement of the phase difference pixels, the opening directions, the light blocking rates, and the kinds of optical filters.

The ranging calculation processing unit 213 reads the processed phase difference pixel data from the phase difference pixel frame memory 214. On the basis of the processed phase difference pixel data, the ranging calculation processing unit 213 applies the added phase difference pixel data to the phase difference pixels for which it has been determined to perform the focus detection operation on the basis of the added phase difference pixel data. The ranging calculation processing unit 213 applies the phase difference pixel data in the current frame to the phase difference pixels for which it has been determined not to perform the focus detection operation on the basis of the added phase difference pixel data, and the ranging calculation processing unit 213 finally performs the focus detection operation (ST150).

The image processing unit 24 receives the recording pixel data output in the frame in which the focus detection operation has been performed, and subjects the recording pixel data to image processing to generate image data. The display unit 18 displays the generated image data on, for example, a liquid crystal display (ST160).

The CPU 16 sends a control signal to the lens drive unit 12 on the basis of information regarding a focus detected by the ranging calculation processing unit 213, and performs focus adjustment control in the subsequent frames. The CPU 16 also sends a control signal to the image pickup device drive unit 15, and controls so that recording pixel data after the focus adjustment will be sent. The image processing unit 24 receives the recording pixel data in which the focus has been adjusted, and subjects the recording pixel data to image processing to generate image data. The display unit 18 displays the image data in which the focus has been adjusted on, for example, the liquid crystal display.

Next, details of a determination operation and a calculation operation above steps ST120 to ST150 adapted to the characteristics of the phase difference pixels and the phase difference pixel data corresponding to the phase difference pixels are described.

The determination unit 2121 may perform the determination operation in accordance with the size of each phase difference pixel data. Specifically, when the phase difference pixel data in the current frame is less than a predetermined threshold, the determination unit 2121 determines to perform the focus detection operation on the basis of the phase difference pixel data added to the phase difference pixel data of the same coordinates in the past frame. The determination unit 2121 may determine the number of past frames to be added in accordance with the size of the phase difference pixel data in the current frame. For example, when the size of the phase difference pixel data in the current frame is about ⅓ of a desired value, the determination unit 2121 sets the number of past frames to "2" as calculation information, and sends the set number of past frames to the phase difference pixel calculation unit 2122. FIG. 12 is a timing chart to add past two frames and the current frame. FIGS. 12(A) to (E) are the same as FIGS. 9(A) to (E). In this case, as shown in FIG. 12(F), when the frame number of the current frame is "2", the phase difference pixel calculation unit 2122 adds the phase difference pixel data Z0 and Z1 in two past frames to phase difference pixel data Z2 in the current frame, and calculates the phase difference pixel data S1.

When the phase difference pixel data in the current frame is equal to or more than the predetermined threshold, the determination unit 2121 may determine not to perform the addition calculation regarding this phase difference pixel data. When the phase difference pixel data is in the vicinity of saturation, the determination unit 2121 may determine to perform a frame addition after a previous division.

The determination unit 2121 may perform the determination operation in accordance with the characteristics of the light blocking rate of each phase difference pixel as the characteristics of each phase difference pixel. In general, when the light blocking rate of the phase difference pixels is low, the amount of light that is blocked is small, so that an output of phase difference pixel data that can ensure ranging accuracy is obtained. In contrast, when the light blocking rate is high, light that reaches the light receiving portions are considerably blocked, so that a full output may not be obtained. Therefore, when the light blocking rate of the phase difference pixels corresponding to the phase difference pixel data to be determined is high, the determination unit 2121 determines to perform the focus detection operation on the basis of the phase difference pixel data added to the phase difference pixel data of the same coordinates in the past frame. In contrast, when the light blocking rate is low, the determination unit 2121 may determine not to add the phase difference pixel data, or may determine to perform the focus detection operation on the basis of the additional average for the purpose of noise removal.

The determination unit 2121 may perform the determination operation in accordance with the characteristics of the optical filter disposed in front of the light receiving portion of each phase difference pixel. As shown in FIG. 13, G, B, and R filters having different spectral characteristics depending on the wavelength range are disposed in the respective phase difference pixels. A G filter spectral characteristic 3001 transmits a relatively wide wavelength range. Therefore, even if reflected light from the subject has blue and red components, phase difference pixel data that can ensure ranging accuracy is obtained in the phase difference pixel in which the G filter is disposed. In contrast, a B filter spectral characteristic 3002 has a low transmission factor of a long wavelength range, for example, a red component, so that a full output may not be obtained in the phase difference pixel in which the B filter is disposed in the case of a subject in a long wavelength region. Similarly, a R filter spectral characteristic 3003 has a low transmission factor of a short wavelength range, for example, a blue component, so that a full output may not be obtained in the phase difference pixel in which the R filter is disposed in the case of a subject in a short wavelength region. Therefore, the determination unit 2121 determines not to add the phase difference pixel data in which the G filter is disposed, and determines to add the phase difference pixel data in which the B and R filters are disposed. The determination unit 2121 may calculate an average value of the phase difference pixel data for each kind of optical filter, and may determine to perform the ranging calculation using phase difference data for the added frames when the average value is less than a predetermined threshold. The determination unit 2121 may read the recording pixel data in the current frame from the memory unit 17, and determine whether to perform the addition calculation on the basis of the output levels of R, G, and B in the recording pixel data.

As described above, in the first embodiment, the phase difference pixel extraction unit 211 reads the phase difference pixel data which has been obtained by performing the storing operation in the same storing time for each phase difference pixel in each frame of the imaging operation. The determination unit 2121 determines whether to perform the focus detection operation on the basis of the phase difference pixel data added regarding the same coordinates in the current frame and the past frame in accordance with the characteristics of each phase difference pixel and the phase difference pixel data corresponding to each phase difference pixel. It is thus possible to increase the reliability of the ranging calculation without separating the frames to output the pixel data in the recording pixels and the phase difference pixels. Therefore, it is possible to perform the focus detection operation without deteriorating the continuity of the recording pixel output. Even when the frames by the recording pixels need to be continuously output as in a moving image mode, it is not necessary to extend a phase difference pixel read frame to gain the storing time for the phase difference pixels, and smooth display is possible. Moreover, it is possible to increase the reliability of the ranging calculation without providing an independent electronic shutter circuit only for the phase difference pixel portions. It is therefore possible to prevent performance deterioration for adjacent pixels such as an output level difference or an after-image by inhibiting the increase in the complexity of the imaging circuit, deterioration of the opening ratio, and pixel reading response deterioration resulting from, for example, the increase of parasitic capacitance of an additional circuit. In addition, it is possible to determine whether to individually add the phase difference pixels in the frames, so that phase difference pixel outputs having blown-out highlights and blocked-up shadows can be eliminated. It is also possible to eliminate side-effects such as the deterioration of the light collection efficiency resulting from a filter configuration which is different from the recording pixels, and a leakage to adjacent recording pixels attributed to extremely high sensitivity.

The determination unit 2121 determines whether to perform the focus detection operation on the basis of the added phase difference pixel data in accordance with the output of each phase difference pixel data. Thus, even phase difference pixel data of low output can ensure an output necessary for a sufficient ranging calculation. In particular, even in the case of an operation in which the gradation of sensor output is decreased due to the increase of the speed of sensors as in the live-view or moving images, ranging calculation errors can be inhibited by adding the outputs in the past frames.

The determination unit 2121 determines whether to perform the focus detection operation on the basis of the added phase difference pixel data in accordance with the characteristics of the light blocking rate of each phase difference pixel. This can eliminate the difference of ranging calculation errors between the phase difference pixels in which the light entrance amount is considerably limited and the phase difference pixels in which the light entrance amount is not much limited.

The determination unit 2121 determines whether to perform the focus detection operation on the basis of the added phase difference pixel data in accordance with the characteristics of the optical characteristic filter disposed in front of the light receiving portion of each phase difference pixel. It is thus possible to ensure ranging calculation accuracy regardless of the damping of the phase difference pixel data caused by the wavelength range of the reflected light of the subject. It is possible to ensure ranging calculation accuracy regardless of the configuration in which transparent filters are disposed without color filters are disposed to obtain the output of the phase difference pixel data.

The image processing unit 24 reads the recording pixel data in the frame obtained when the focus detection operation is performed by the ranging calculation unit 21, and generates image data. The display unit 18 performs a display operation on the basis of the generated image data. It is thus possible to provide an imaging apparatus which maintains the quality of data for display or recording and which can still ensure ranging performance.

Second Embodiment

Next, the second embodiment of the present invention is described. In the first embodiment described above, whether to perform a frame addition is determined in accordance with conditions applicable to the whole image pickup device, for example, the difference of phase difference pixel characteristics such as the size of the phase difference pixel data, the light blocking rate of the phase difference pixel, and the characteristics of the optical filters. However, it is also considered that when an actual focus detection operation is performed, more accurate focus detection may be performed by further limiting the area to perform the focus detection. In the example according to the second embodiment, when a ranging area to perform the focus detection operation is further set in addition to the first embodiment described above, whether to perform a frame addition is determined regarding the phase difference pixels in the set ranging area. Here, the second embodiment is similar to the first embodiment except for the setting operation of the ranging area and the determination operation. Therefore, the configuration of the camera and operations other than operations different from those in the above first embodiment are not described.

FIG. 14 is a flowchart showing the focus detection operation by the imaging apparatus according to the second embodiment. First of all, the manipulation unit 20 sets a ranging area to perform the focus detection operation in response to a manipulation from a user (ST210). The manipulation unit 20 sends information regarding the set ranging area to the CPU 16. The CPU 16 performs an operation sequence regarding the focus detection operation on the basis of the set ranging area.

The CPU 16 sends a control signal based on the calculation result in the exposure calculation unit 22 to the image pickup device drive unit 15. The image pickup device 13 and the image pickup device drive unit 15 store a charge resulting from the exposure in the image pickup device 13 and perform an output scan of pixel data.

The phase difference pixel extraction unit 211 reads the phase difference pixel data which has been obtained by performing the storing operation in the same storing time for each phase difference pixel in each frame of the imaging operation of the image pickup device 13 (ST220). The determination unit 2121 determines whether to perform the focus detection operation on the basis of the added phase difference pixel data in accordance with the characteristics of each phase difference pixel and the phase difference pixel data corresponding to each phase difference pixel. The determination unit 2121 also determines whether to perform the focus detection operation on the basis of the added phase difference pixel data in accordance with a focus detection area including the phase difference pixels (ST230).

Specifically, when determining to perform the focus detection operation on the basis of the added phase difference pixel data (ST230; yes), the determination unit 2121 sends the phase difference pixel data Z1 in the current frame to the phase difference pixel calculation unit 2122. The phase difference pixel calculation unit 2122 receives the phase difference pixel data in the past frame from the phase difference pixel frame memory 214, and adds the phase difference pixel data of the same coordinates between the respective frames (ST240). The phase difference pixel calculation unit 2122 sends the added phase difference pixel data to the phase difference pixel frame memory 214. In contrast, when determining not to perform the focus detection operation on the basis of the added phase difference pixel data (ST230; no), the determination unit 2121 sends the phase difference pixel data in the current frame to the phase difference pixel frame memory 214. The pixel data processing unit 212 repeats steps ST230 to ST240 until steps ST230 to ST240 are performed for all the phase difference pixels in the ranging area (ST250).

The ranging calculation processing unit 213 reads the processed phase difference pixel data from the phase difference pixel frame memory 214. On the basis of the processed phase difference pixel data, the ranging calculation processing unit 213 applies the added phase difference pixel data to the phase difference pixels for which it has been determined to perform the focus detection operation on the basis of the added phase difference pixel data. The ranging calculation processing unit 213 applies the phase difference pixel data in the current frame to the phase difference pixels for which it has been determined not to perform the focus detection operation on the basis of the added phase difference pixel data, and performs the focus detection operation (ST260).

The image processing unit 24 receives the recording pixel data output in the frame in which the focus detection operation has been performed, and subjects the recording pixel data to image processing to generate image data. The display unit 18 displays the generated image data on, for example, a liquid crystal display (ST270).

The CPU 16 sends a control signal to the lens drive unit 12 on the basis of information regarding a focus detected by the ranging calculation processing unit 213, and performs focus adjustment control in the subsequent frames. The CPU 16 also sends a control signal to the image pickup device drive unit 15, and controls so that recording pixel data after the focus adjustment will be sent. The image processing unit 24 receives the recording pixel data in which the focus has been adjusted, and subjects the recording pixel data to image processing to generate image data. The display unit 18 displays the image data in which the focus has been adjusted on, for example, the liquid crystal display.

Next, details of a determination operation and a calculation operation adapted to the ranging area in which the focus detection operation in above steps ST230 to ST260 is performed are described.

The determination unit 2121 may perform the determination operation in accordance with the ranging area (focus detection area) including the phase difference pixels. Specifically, the determination unit 2121 may perform the determination operation in accordance with the image height of each phase difference pixel in the ranging area.

Figure 15:
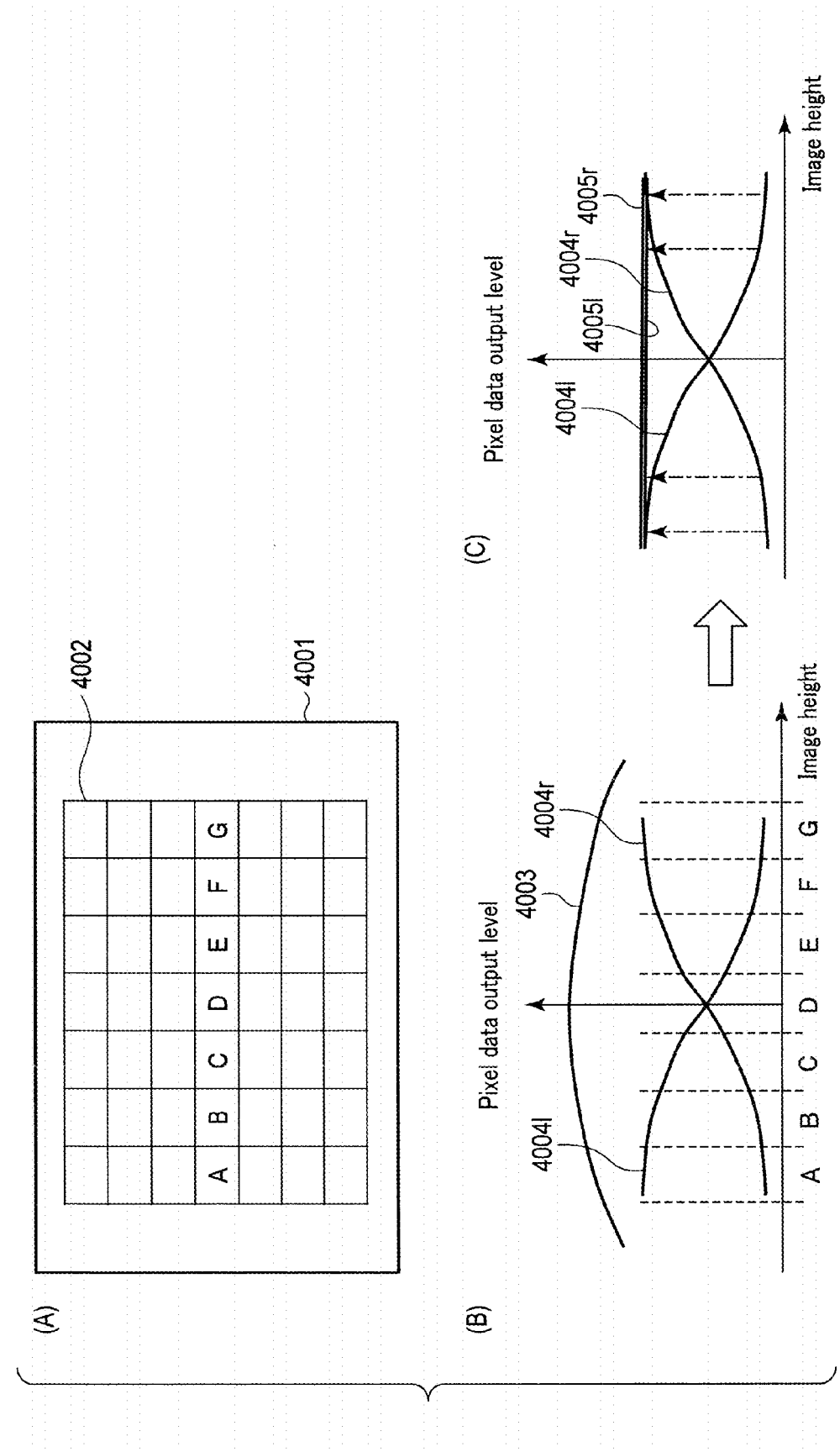
FIG. 15 is a schematic diagram showing the difference of output levels resulting from image heights according to the second embodiment.

FIG. 15 is a diagram showing one example of the correlation between the image pickup device 13 and image height. FIG. 15(A) shows how a phase difference pixel arrangement area 4002 in a recording pixel arrangement area 4001 is divided into areas A to G in the horizontal direction according to the distance (image height) from the optical axis so that the area D is an area corresponding to the optical axis center. Here, the output levels of recording pixel data and phase difference pixel data in the areas A to G are represented as in FIG. 15(B) in which the image height is indicated on the horizontal axis. That is, a recording pixel data output 4003 is lower in output level in the areas A and G at a longer distance from the optical axis than in the area D because of incidence angle characteristics of the microlens and lens characteristic parameters such as a pupil position. In contrast, the phase difference pixel data varies in the change of the output level depending on the opening directions. That is, a right opening phase difference pixel data output 4004*r* is lower in output level in the left area A, and a left opening phase difference pixel data output 4004*l* is lower in output level in the right area G. In this way, the phase difference pixels at the same image height are different in output level in their opening directions. In the ranging calculation, the output difference of the phase difference pixel data in the R/L and T/B pairs is corrected by, for example, a gain increase when a correlated calculation is performed, as shown in FIG. 15(C). In the example of FIG. 15(C), the right opening phase difference pixel data output 4004r and the left opening phase difference pixel data output 4004l are homogenized into a corrected right opening phase difference pixel data output 4005r and a corrected left opening phase difference pixel data output 4005l. However, when there is a great difference of the output levels as above, the output difference can not be properly corrected by the gain increase, which leads to deterioration of ranging accuracy.

Therefore, the determination unit 2121 determines whether to homogenize the output levels of R/L or T/B on the basis of prestored information regarding an output relative ratio at each image height in accordance with an image height area including the ranging area targeted for the focus detection operation. When determining to homogenize the output levels, the determination unit 2121 determines to add the pixel data of a lower output between the phase difference pixels of R/L or T/B frame by frame. The determination unit 2121 may determine to add the pixel data of a higher output frame by frame and then calculate an average value.

The determination unit 2121 may perform the determination operation in accordance with a scan time between vertical start coordinates and vertical end coordinates in the ranging area and the storing time.

Figure 16:
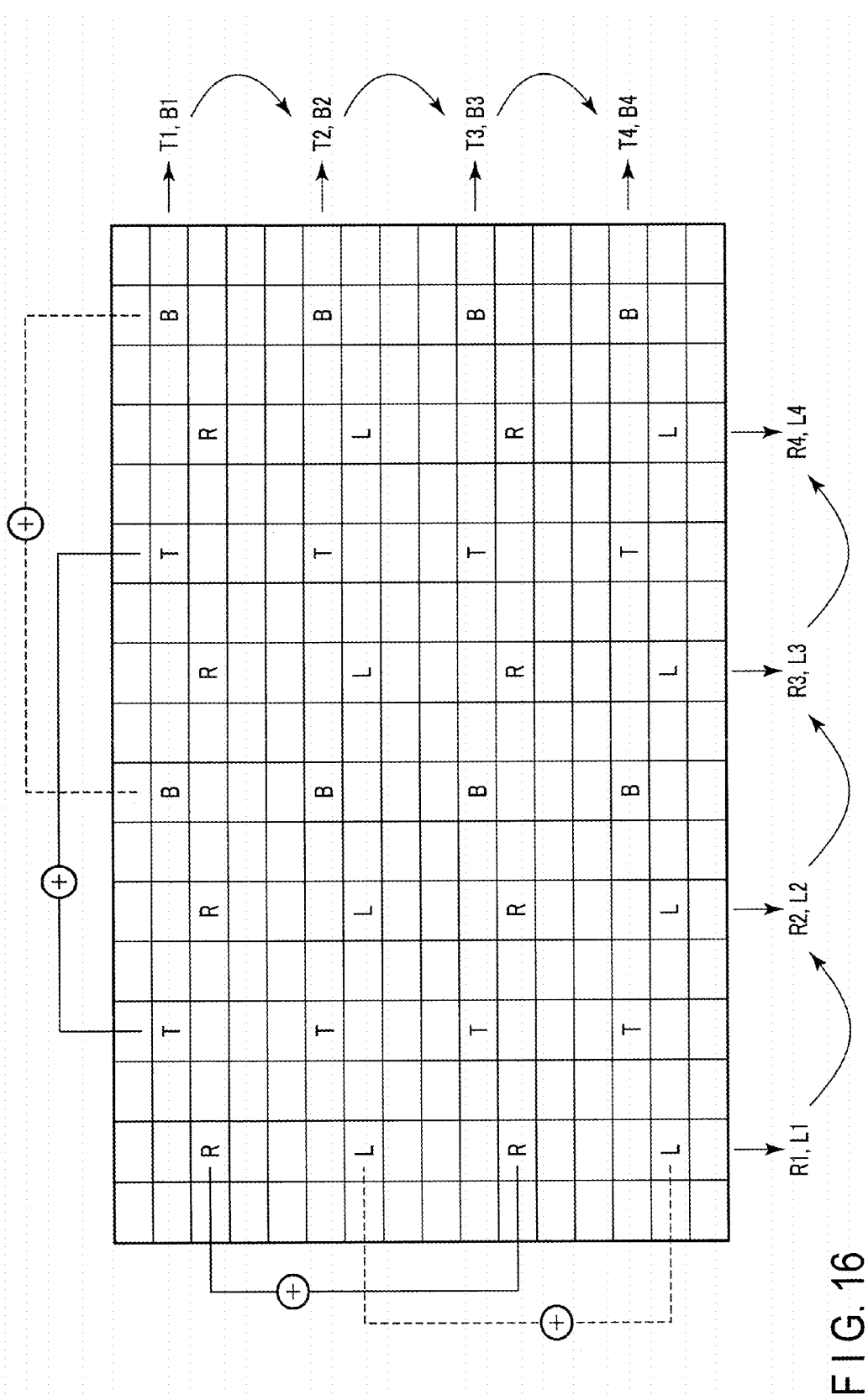
FIG. 16 is a schematic diagram showing one example of a correlated calculation according to the second embodiment.

FIG. 16 is a diagram showing one example of the relation between the opening directions of the phase difference pixels disposed in the light receiving surface and phase difference pixel data that are correlated at the time of the correlated calculation. In FIG. 16, the pixel data in the area in which openings of the phase difference pixels are disposed at the left, right, top, and bottom are indicated as L, R, T, and B, respectively. Here, in the example of FIG. 16, the correlated calculation by the T/B pixels is performed for phase difference pixel data (T1, B1), (T2, B2), (T3, B3), and (T4, B4) that are calculated in the row direction (vertical direction). When the correlated calculation is performed in the T/B pixels in this way, the correlated calculation is performed between the phase difference pixels exposed in different time zones. Thus, when the output of a light source varies with time, there is a difference between the outputs of the phase difference pixel data. If such phase difference pixel data are applied to perform the focus detection operation, there is a possibility that the ranging calculation processing unit 213 may wrongly recognize the output variation of the light source with time as a subject component.

In contrast, the correlated calculation by the R/L pixels is performed for phase difference pixel data (R1, L1), (R2, L2), (R3, L3), and (R4, L4) that are calculated in the column direction (horizontal direction). Therefore, when the correlated calculation is performed in the R/L pixels, the correlated calculation is performed between the phase difference pixels exposed at the same time. Thus, even when the output of the light source varies with time, the difference of outputs between the phase difference pixel data is small.

When the brightness and darkness of the light source vary due to, for example, flickering of the light source as above, there is a possibility that this flicker component may mainly affect the ranging calculation of T/B direction opening pixels. For example, light emitting diode (LED) light sources in a night view or an illumination include a flicker component at, for example, 100 Hz, and the light sources are locally present, so that flickering detection by the flicker calculation unit 23 can not be determined in some cases.

Figure 17:
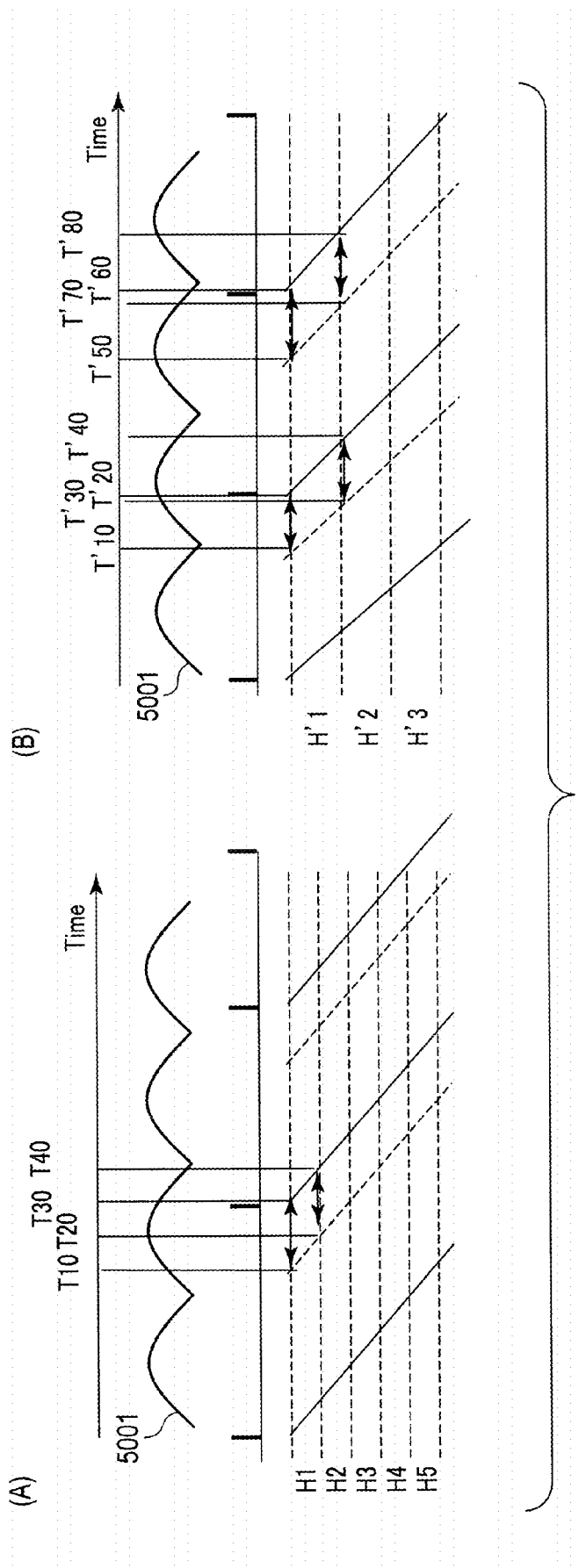
FIG. 17 is a schematic diagram showing the relation among output variations of a light source, a timing chart of a storing operation, and output scanning in a ranging area according to the second embodiment.

Here, the relation between the scan time from the vertical scan start to the vertical scan end in the ranging area and the storing time and the relation with the light source output that varies with time are shown in FIG. 17 and FIG. 18 as examples illustrating how the phase difference pixel output in the ranging area varies due to the flicker component. FIGS. 17(A) and 17(B) are a timing chart showing storing and output scans in ranging areas (H1 to H5 or H'1 to H'3) distributed in the row direction, and a schematic diagram showing the relation with the variation of a light source output 5001 with time. The variation of the light source output 5001 with time shows that luminance periodically changes. FIG. 18 is a schematic diagram showing the variation of the light source output 5001 stored in the T/B direction opening pixels in the ranging area in FIG. 17(B). Each of pixel arrangement areas 5002 and 5003 in FIG. 18 indicates a row including the ranging area H'1 in adjacent frames. In FIG. 18, rows in which a charge is stored in a time zone when the light source output 5001 is strong are indicated in white, and rows in which a charge is stored in a time zone when the light source output 5001 is weak are hatched.

In the ranging area H1 in FIG. 17(A), storing in rows at the top (vertical start coordinates) is performed in times T10 to T30, and storing in rows at the bottom (vertical end coordinates) is performed in times T20 to T40. Here, the variations of the light source output 5001 in the times T10 to T30 and the times T20 to T40 overlap in most time zones, and a high output continues at each time.

Meanwhile, in the ranging area H'1 in FIG. 17(B), storing in rows of the vertical start coordinates is performed in times T'10 to T'30, and storing in rows of the vertical end coordinates is performed in times T'20 to T'40. In the next frame, storing in rows of the vertical start coordinates is performed in times T'50 to T'70, and storing in rows of the vertical end coordinates is performed in times T'60 to T'80. Here, in the variation of the light source output 5001 in the times T'10 to T'30, a relatively weak output continues. Therefore, in the rows of the vertical start coordinates in the pixel arrangement area 5002 in FIG. 18, a charge is stored in a time zone when the light source output 5001 is weak. In contrast, in the variation of the light source output 5001 in the times T'20 to T'40, a relatively strong output continues. Therefore, in the rows of the vertical end coordinates in the pixel arrangement area 5002 in FIG. 18, a charge is stored in a time zone when the light source output 5001 is strong. In this case, the T/B pixel output in the ranging area H'1 is affected by the flicker component, and deteriorates in accuracy at the time of the correlated calculation. This is because the times T'30 to T'40 required to read the number of phase difference pixel arrangement rows in the ranging area H'1 are equal to or more than the storing times T'10 to T'30.

The influence of such a flicker component variably appears frame by frame. For example, in FIG. 18, in the variation of the light source output 5001 in the times T'50 to T'70, a relatively strong output continues. Therefore, in the rows of the vertical start coordinates in the pixel arrangement area 5003 of the next frame in FIG. 18, a charge is stored in a time zone when the light source output 5001 is strong. In contrast, in the variation of the light source output 5001 in the times T'60 to T'80, a relatively weak output continues. Therefore, in the rows of the vertical end coordinates in the pixel arrangement area 5003 of the next frame in FIG. 18, a charge is stored in a time zone when the light source output 5001 is strong. That is, the variation of the phase difference pixel data in each row in the ranging area caused by the flicker component can be smoothed by a frame-by-frame addition or an additional average.

Therefore, when a conditional expression shown below is satisfied, the determination unit 2121 determines to add the pixel data regarding the T/B phase difference pixels frame by frame to smooth the influence of the flicker component.

(Time required to read the number of phase difference pixel arrangement rows in the ranging area)≥storing time Moreover, when the conditional expression shown above is satisfied, the determination unit 2121 may determine to calculate an additional average by adding the pixel data regarding the T/B phase difference pixels frame by frame and then dividing by the number of the added frames.

As described above, in the second embodiment, a focus detection area in which the focus detection operation is performed is set, and a determination is made in accordance with the set focus detection area including each phase difference pixel. Thus, whether to perform addition processing is determined in accordance with the image height of the set focus detection area, so that the output level varying with the image height can be corrected, in addition to the advantageous effects according to the first embodiment. It is therefore possible to provide an imaging apparatus which maintains the quality of data for display or recording and which can still ensure ranging performance.

Specifically, in the ranging calculation, the output difference of the phase difference pixel data in the R/L and T/B pairs is corrected, and the correlated calculation between R/L and T/B is performed. However, in the phase difference pixels, the outputs of R/L or T/B are not uniform depending on the image height of the set ranging area and the opening directions of the phase difference pixels disposed in the ranging area, so that the accuracy of the ranging calculation deteriorates. According to conventional techniques, a gain is given to one of the R/L and T/B phase difference pixel data to homogenize the output. Thus, according to the conventional techniques, in an image height area of a low output, data become discrete as a result of the addition of the gain, which may affect the ranging calculation accuracy. Another effect of the conventional techniques is noise in data that is also amplified by the gain. In contrast, according to the second embodiment, whether to add each phase difference pixel against non-uniformity of outputs attributed to the opening directions is determined, so that it is possible to ensure the output level by adding an output frame by frame in the image height area of the low output. Moreover, an output is added between frames, so that it is possible to reduce the effect of noise and also homogenize the outputs of R/L or T/B.

Furthermore, a determination is made in accordance with a scan time between vertical start coordinates and vertical end coordinates in the set focus detection area and the storing time. Consequently, it is possible to reduce the effect of flickering caused to the T/B pixels when reset processing and read processing are performed every other row in rolling shutter control. In global shutter control as well, it is possible to reduce the variation of the output level caused by the effect of flickering that can occur between frames.

While the present invention has been described above in connection with each of the embodiments, the present invention is not limited to each of the embodiments described above, and various modifications and applications can be made within the spirit of the present invention.

For example, a charge reading method in each of the embodiments according to the present invention is not limited to the examples described above. It is also possible to suitably apply a method which separates frames of the recording pixel output and the phase difference pixel output as shown in FIG. 19(A), and a method which provides an independent electronic shutter for the phase difference pixels alone as shown in FIG. 19(B).

In the determination operation in each of the embodiments according to the present invention, the number of frames to be added may be previously decided to reduce the increase of the calculation amount. Specifically, the determination unit 2121 may set a power of 2 as the number of frames to be added to reduce the increase of the calculation amount.

The determination operation in each of the embodiments according to the present invention may be performed in consideration of the case in which the subject moves between frames. For example, when there is a difference of the coordinates of the phase difference pixel data in which the same subject is imaged between frames, the pixel data processing unit 212 may perform a calculation for both the phase difference pixel data in which the same subject is imaged. Specifically, when determining to perform the focus detection operation, the determination unit 2121 may calculate a difference amount of the subject between the current frame and the past frame. The determination unit 2121 may decide the correspondence of the phase difference pixels having the same characteristics between frames on the basis of the calculated difference amount of the subject between frames. The phase difference pixel calculation unit 2122 may perform the addition calculation on the basis of the decided correspondence.

The determination operation shown in the first embodiment and the determination operation shown in the second embodiment are not exclusively performed independently, and any combination of the determination operations can be performed. Specifically, the determination unit 2121 may make a composite determination in accordance with the output of the phase difference pixel data, the characteristics of the light blocking rate, the characteristics of the optical filters, the ranging area, the scan time between vertical start coordinates and vertical end coordinates, and the storing time. The phase difference pixel calculation unit 2122 may perform a calculation including at least an addition in accordance with the result of the composite determination, and the ranging calculation processing unit 213 may apply this calculation result to finally perform the focus detection operation.

Various inventions can be made by properly combining the components disclosed in each of the embodiments described above. For example, some of all the components shown in each of the embodiments described above may be eliminated. Moreover, the components in different embodiments may be suitably combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus comprising:
    an image pickup device comprising recording pixels, and phase difference pixels in which part of an opening of a light receiving portion in each of the recording pixels is blocked;
    a phase difference pixel extraction unit which reads phase difference pixel data obtained by performing a storing operation in the same storing time for each of the phase difference pixels in each frame of an imaging operation of the image pickup device;

a phase difference pixel calculation unit which adds the read frame-by-frame phase difference pixel data of the same coordinates in a current frame and a past frame;

a determination unit which determines whether to perform a focus detection operation based on the added phase difference pixel data in accordance with characteristics of each of the phase difference pixels and the phase difference pixel data corresponding to the phase difference pixels; and a ranging calculation processing unit, the ranging calculation processing unit applying the phase difference pixel data added by the phase difference pixel calculation unit when it is determined to perform the focus detection operation on the basis of the added phase difference pixel data, the ranging calculation processing unit otherwise applying the phase difference pixel data in the current frame to perform the focus detection operation.

2. The imaging apparatus according to claim 1, wherein the determination unit determines in accordance with the size of each piece of the phase difference pixel data.

3. The imaging apparatus according to claim 1, wherein the determination unit determines in accordance with the characteristics of the light blocking rate of each of the phase difference pixels.

4. The imaging apparatus according to claim 1, wherein each of the phase difference pixels has an optical filter different in characteristics disposed in front of the light receiving portion, and
the determination unit determines in accordance with the characteristics of the optical filters of the phase difference pixels.

5. The imaging apparatus according to claim 1, wherein a manipulation unit to set a focus detection area in which the focus detection operation is performed is provided in the image pickup device, and
the determination unit determines in accordance with the set focus detection area including the phase difference pixels.

6. The imaging apparatus according to claim 1, wherein a manipulation unit to set a focus detection area in which the focus detection operation is performed is provided in the image pickup device, and
the determination unit determines in accordance with a scan time between vertical start coordinates and vertical end coordinates in the set focus detection area, and the storing time.

7. The imaging apparatus according to claim 1, further comprising a display unit configured to perform a display operation on the basis of recording pixel data obtained in each frame of the imaging operation of the image pickup device,
the phase difference pixel extraction unit further reads the recording pixel data, and
the display unit performs the display operation on the basis of the recording pixel data obtained in a frame in which the focus detection operation has been performed.

8. An imaging method of an imaging apparatus comprising:
reading phase difference pixel data obtained by performing a storing operation in the same storing time for each of phase difference pixels in each frame of an imaging operation by an image pickup device, the image pickup device comprising recording pixels, and the phase difference pixels in which part of an opening of a light receiving portion in each of the recording pixels is blocked;

adding the read frame-by-frame phase difference pixel data of the same coordinates in a current frame and a past frame;

determining whether to perform a focus detection operation based on the added phase difference pixel data in accordance with the characteristics of each of the phase difference pixels and the phase difference pixel data corresponding to the phase difference pixels; and applying the added phase difference pixel data when it is determined to perform the focus detection operation on the basis of the added phase difference pixel data, or otherwise applying the phase difference pixel data in the current frame to perform the focus detection operation.

9. The imaging method of the imaging apparatus according to claim 8, wherein the determination is made in accordance with the size of each piece of the phase difference pixel data.

10. The imaging method of the imaging apparatus according to claim 8, wherein the determination is made in accordance with the characteristics of the light blocking rate of each of the phase difference pixels.

11. The imaging method of the imaging apparatus according to claim 8, wherein each of the phase difference pixels has an optical filter different in characteristics disposed in front of the light receiving portion, and
the determination is made in accordance with the characteristics of the optical filters of the phase difference pixels.

12. The imaging method of the imaging apparatus according to claim 8, further comprising setting, in the image pickup device, a focus detection area in which the focus detection operation is performed,
wherein the determination is made in accordance with the set focus detection area including the phase difference pixels.

13. The imaging method of the imaging apparatus according to claim 8, further comprising setting, in the image pickup device, a focus detection area in which the focus detection operation is performed,
wherein the determination is made in accordance with a scan time between vertical start coordinates and vertical end coordinates in the set focus detection area, and the storing time.

14. The imaging method of the imaging apparatus according to claim 8, further comprising displaying on the basis of recording pixel data obtained in each frame of the imaging operation of the image pickup device,
wherein the reading comprises further reading the recording pixel data, and
the displaying comprises displaying on the basis of the recording pixel data obtained in a frame in which the focus detection operation has been performed.

15. A non-transitory computer-readable storage medium storing a program which causes an imaging apparatus to:
read phase difference pixel data obtained by performing a storing operation in the same storing time for each of phase difference pixels in each frame of an imaging operation by an image pickup device, the image pickup device comprising recording pixels, and the phase difference pixels in which part of an opening of a light receiving portion in each of the recording pixels is blocked;

add the read frame-by-frame phase difference pixel data of the same coordinates in a current frame and a past frame;

determine whether to perform a focus detection operation based on the added phase difference pixel data in accordance with the characteristics of each of the phase difference pixels and the phase difference pixel data corresponding to the phase difference pixels; and apply the added phase difference pixel data when it is determined to perform the focus detection operation on the basis of the added phase difference pixel data, or otherwise apply the phase difference pixel data in the current frame to perform the focus detection operation.

16. The storage medium according to claim 15, wherein the determination is made in accordance with the size of each piece of the phase difference pixel data.

17. The storage medium according to claim 15, wherein the determination is made in accordance with the characteristics of the light blocking rate of each of the phase difference pixels.

18. The storage medium according to claim 15, wherein each of the phase difference pixels has an optical filter different in characteristics disposed in front of the light receiving portion, and the determination is made in accordance with the characteristics of the optical filters of the phase difference pixels.

19. The storage medium according to claim 15, wherein a program to set, in the image pickup device, a focus detection area in which the focus detection operation is performed is further stored, and the determination is made in accordance with the set focus detection area including the phase difference pixels.

20. The storage medium according to claim 15, wherein a program to set, in the image pickup device, a focus detection area in which the focus detection operation is performed is further stored, and the determination is made in accordance with a scan time between vertical start coordinates and vertical end coordinates in the set focus detection area, and the storing time.

* * * * *